US012638802B2

(12) United States Patent
Nakamura et al.

(10) Patent No.: US 12,638,802 B2
(45) Date of Patent: May 26, 2026

(54) COVER, HOUSING, AND IMAGE FORMING APPARATUS

(71) Applicant: FUJIFILM Business Innovation Corp., Tokyo (JP)

(72) Inventors: Wataru Nakamura, Kanagawa (JP); Akira Tanaka, Kanagawa (JP); Akira Ueshima, Kanagawa (JP); Riwako Miyauchi, Kanagawa (JP); Shuichi Nishide, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/161,902

(22) Filed: Jan. 31, 2023

(65) Prior Publication Data

US 2024/0053702 A1 Feb. 15, 2024

(30) Foreign Application Priority Data

Aug. 15, 2022 (JP) ................................ 2022-129228

(51) Int. Cl.
*G03G 21/16* (2006.01)
*B41J 29/13* (2006.01)

(52) U.S. Cl.
CPC .......... *G03G 21/1633* (2013.01); *B41J 29/13* (2013.01); *G03G 21/1619* (2013.01); *G03G 2221/1678* (2013.01)

(58) Field of Classification Search
CPC ........... G03G 21/1619; G03G 21/1633; G03G 2221/1678; B41J 29/13
See application file for complete search history.

(56) References Cited

U.S. PATENT DOCUMENTS 8,254,823 B2 * 8/2012 Nagashima ............ G03G 21/12 399/120
10,281,876 B2 5/2019 Umenai et al.
2006/0038408 A1 2/2006 Yamaguchi et al.
2016/0161905 A1 6/2016 Ishimitsu et al.

FOREIGN PATENT DOCUMENTS

JP 2006058688 3/2006

OTHER PUBLICATIONS

"Search Report of Europe Counterpart Application", issued on Jan. 16, 2024, p. 1-p. 8.
"Office Action of Europe Counterpart Application", issued on Feb. 3, 2026, p. 1-p. 6.

* cited by examiner

*Primary Examiner* — Sophia S Chen
(74) *Attorney, Agent, or Firm* — JCIPRNET

(57) ABSTRACT

A cover includes: a cover main body that is attached to an attachment target and that has an inner surface facing an attachment target side; a first projection portion that protrudes from the inner surface and that is formed along a first direction; an attachment portion that is attached to the inner surface of the cover main body and that has a facing surface facing the inner surface; and a second projection portion that protrudes from the facing surface, that is formed along the first direction, and that is in contact with the first projection portion in a second direction intersecting the first direction.

20 Claims, 24 Drawing Sheets

FIG. 24

| | DISPLACEMENT AMOUNT [mm] | |
|---|---|---|
| | RIGHT SIDE LOAD (10N) | LEFT SIDE LOAD (10N) |
| EXTERIOR COVER 18 (EXAMPLE) | 1.44 | 1.48 |
| EXTERIOR COVER 18 (COMPARATIVE EXAMPLE) | 1.76 | 1.77 |
| SINGLE INTERNAL PART 20 (EXAMPLE) | 1.89 | 1.90 |
| SINGLE INTERNAL PART 20 (COMPARATIVE EXAMPLE) | 1.86 | 1.86 |

COVER, HOUSING, AND IMAGE FORMING APPARATUS

CROSS-REFERENCE TO RELATED APPLICATIONS

This application is based on and claims priority under 35 USC 119 from Japanese Patent Application No. 2022-129228 filed Aug. 15, 2022.

BACKGROUND

(i) Technical Field

The present invention relates to a cover, a housing, and an image forming apparatus.

(ii) Related Art

JP2006-58688A discloses an exterior cover including an inner cover of an image forming apparatus, which has an integrally formed reinforcing rib for increasing intensity and an outer cover mounting portion, and an outer cover, which has a to-be-mounted portion that is to be mounted on the outer cover mounting portion and of which an outer surface is exposed to the outside in a case where the to-be-mounted portion is mounted on the outer cover mounting portion.

SUMMARY

As a cover, a cover including a cover main body that is attached to an attachment target and that has an inner surface facing an attachment target side, a first projection portion that protrudes from the inner surface and that is formed along a first direction, an attachment portion that is attached to the inner surface of the cover main body and that has a facing surface facing the inner surface, and a second projection portion that protrudes from the facing surface and that is formed along the first direction, is conceivable.

In the cover, in a case where the second projection portion is not in contact with the first projection portion in a second direction that intersects with the first direction, the first projection portion collapses in the second direction and the cover main body is likely to be deformed in a case where an external force is applied to the cover main body.

Aspects of non-limiting embodiments of the present disclosure relate to a cover, a housing, and an image forming apparatus that capable to suppress deformation of the cover main body as compared with a case where the second projection portion is not in contact with the first projection portion in the second direction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a cover including: a cover main body that is attached to an attachment target and that has an inner surface facing an attachment target side; a first projection portion that protrudes from the inner surface and that is formed along a first direction; an attachment portion that is attached to the inner surface of the cover main body and that has a facing surface facing the inner surface; and a second projection portion that protrudes from the facing surface, that is formed along the first direction, and that is in contact with the first projection portion in a second direction intersecting the first direction.

BRIEF DESCRIPTION OF THE DRAWINGS

Exemplary embodiment(s) of the present invention will be described in detail based on the following figures, wherein:

FIG. 24 is a result table illustrating evaluation results.

DETAILED DESCRIPTION

An example of an exemplary embodiment of the present invention will be described below with reference to the drawings.

Image Forming Apparatus 10

Figure 1:
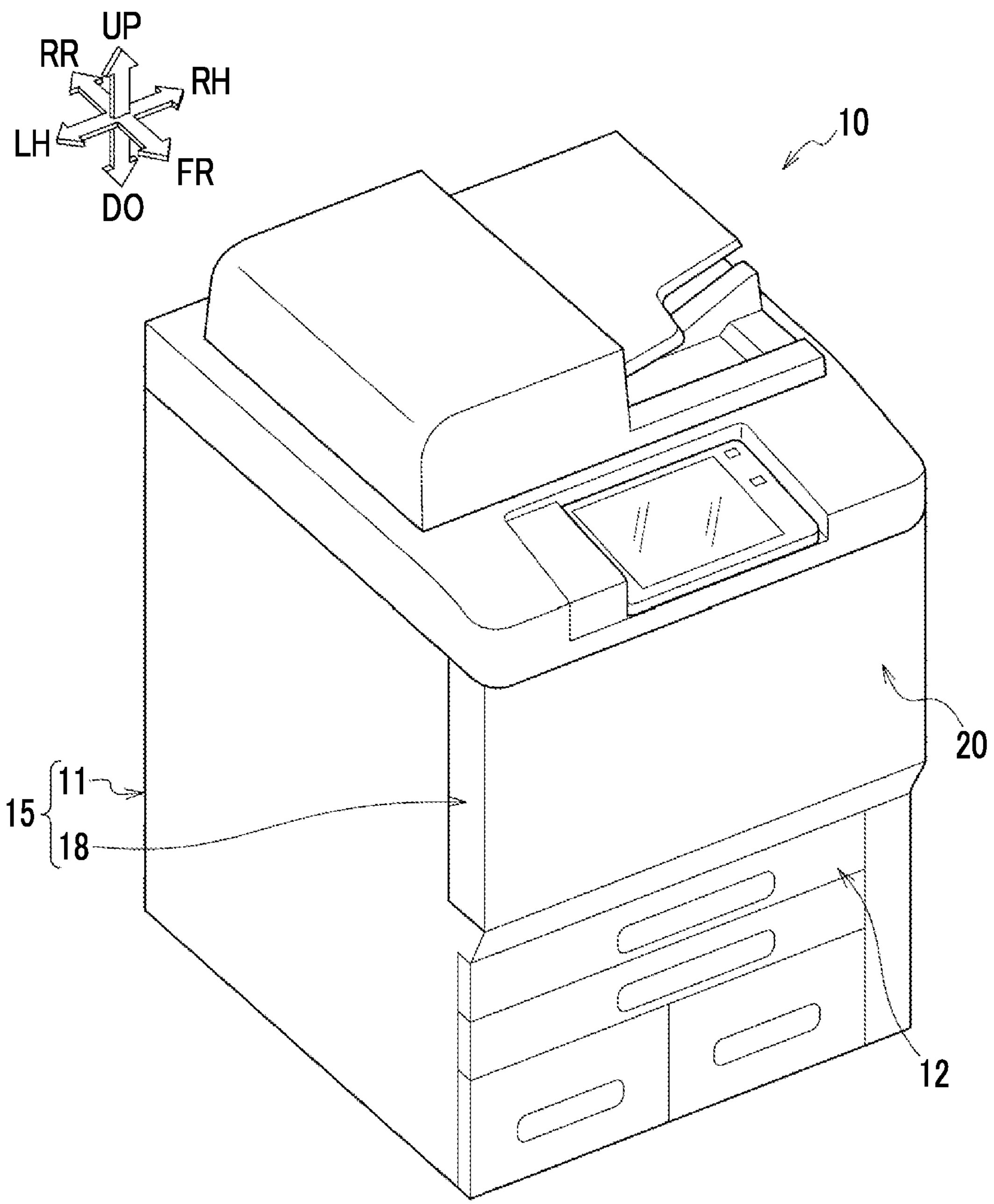
FIG. 1 is a perspective view illustrating an image forming apparatus according to the present exemplary embodiment.
Figure 2:
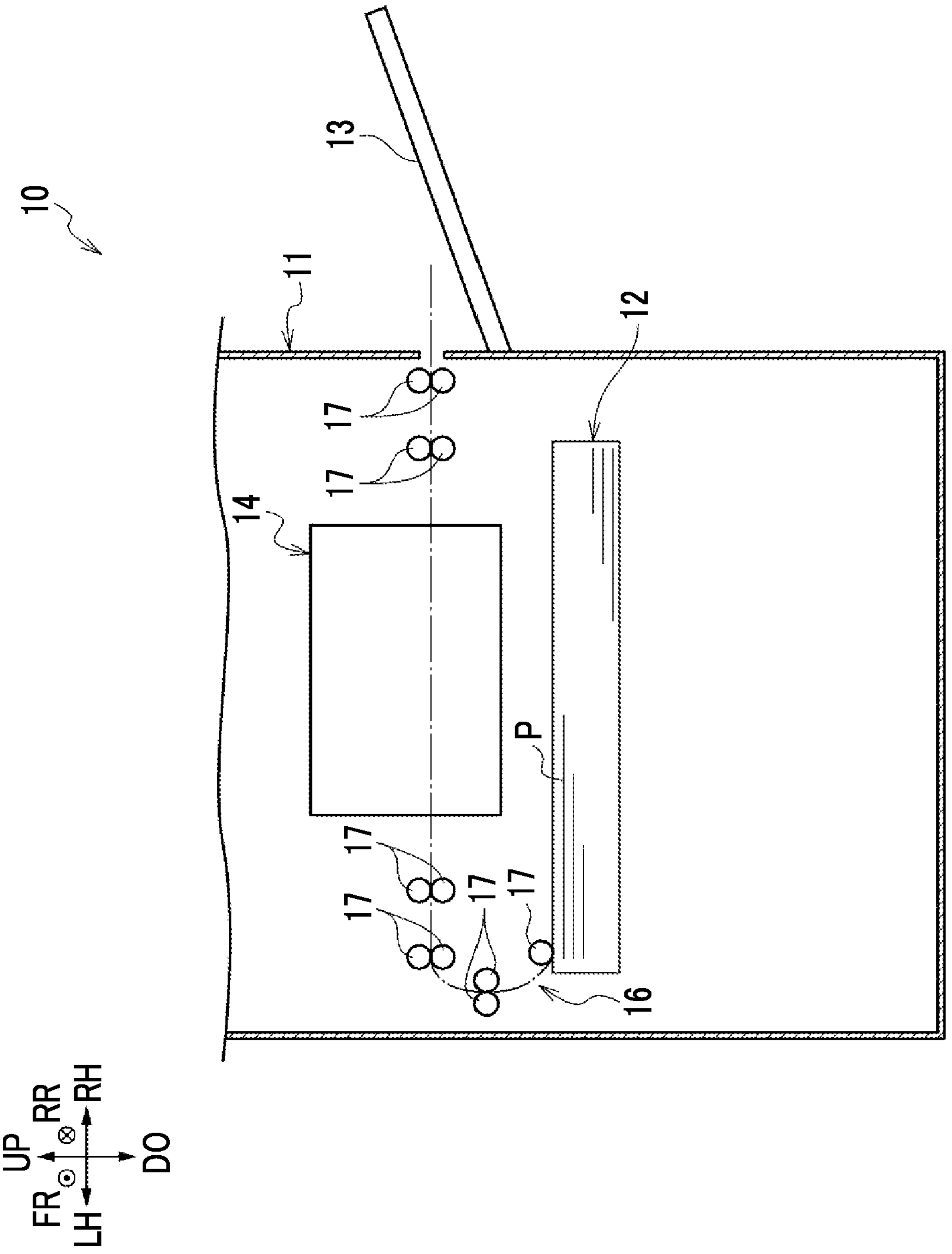
FIG. 2 is a normal cross-sectional view illustrating the image forming apparatus according to the present exemplary embodiment.

First, a configuration of an image forming apparatus 10 according to the present exemplary embodiment will be described. FIG. 1 is a perspective view illustrating the image forming apparatus 10. FIG. 2 is a normal cross-sectional view illustrating the image forming apparatus 10.

An arrow UP illustrated in the figure indicates an up side of an apparatus, and an arrow DO indicates a down side of the apparatus. Further, an arrow LH illustrated in the figure indicates a left side of the apparatus, and an arrow RH indicates a right side of the apparatus. Further, an arrow FR illustrated in the figure indicates a front side of the apparatus, and an arrow RR indicates a rear side of the apparatus. Since these directions are directions determined for convenience of description, a configuration of the apparatus is not limited to these directions. The term "apparatus" may be omitted in each direction of the apparatus. That is, for example, the "up side of the apparatus" may be simply referred to as the "up side".

Further, in the following description, an "up-down direction" may be used to describe "both the up side and the down side" or "either one of the up side or the down side". The term "right-left direction" may be used to describe "both the right side and the left side" or "either one of the right side or the left side". The "right-left direction" can also be said to be a side, a lateral direction, and a horizontal direction. The term "front-rear direction" may be used to describe "both the front side and the rear side" or "either one of the front side or the rear side". The "front-rear direction" can also be said to be a side, a lateral direction, and a horizontal direction. Further, the up-down direction, the right-left direction, and the front-rear direction are directions intersecting each other (specifically, directions orthogonal to each other).

Further, a symbol in which "x" is described in "○" in the figure describes an arrow from the front to the back of the paper. Further, a symbol in which "•" is described in "○" in the figure describes an arrow from the back to the front of the paper. Further, a dimensional ratio of each of the parts illustrated in each of the figures in the up-down direction, the right-left direction, and the front-rear direction may differ from the actual dimensional ratio.

The image forming apparatus 10 illustrated in FIGS. 1 and 2 is an apparatus that forms an image. Specifically, as illustrated in FIGS. 1 and 2, the image forming apparatus 10 includes an image forming apparatus main body 11, a medium accommodation portion 12, and an exterior cover 18. Further, as illustrated in FIG. 2, the image forming apparatus 10 includes a medium discharging portion 13, an image forming portion 14, and a transporting mechanism 16. Hereinafter, each part of the image forming apparatus 10 will be described.

Image Forming Apparatus Main Body 11

The image forming apparatus main body 11 illustrated in FIGS. 1 and 2 is an example of an attachment target and an apparatus main body and is a part where each configuration portion of the image forming apparatus 10 is provided. Specifically, the image forming apparatus main body 11 is formed in a box shape (specifically, a substantially rectangular shape) with a front side open.

The image forming apparatus main body 11 configures a housing 15 with the exterior cover 18 attached to the front side of the image forming apparatus main body 11. That is, the image forming apparatus main body 11 also functions as an example of a housing main body to which the exterior cover 18 is attached. The housing is a box body in which an element having a predetermined function (specifically, a part, a device, or the like) is accommodated.

In the present exemplary embodiment, as illustrated in FIG. 2, for example, the medium accommodation portion 12, the image forming portion 14, and the transporting mechanism 16 are provided inside the image forming apparatus main body 11. As illustrated in FIG. 1, the exterior cover 18 is provided in the front side of the image forming apparatus main body 11. As illustrated in FIG. 2, the medium discharging portion 13 is provided on a side surface of the right side of the image forming apparatus main body 11.

Medium Accommodation Portion 12

As illustrated in FIG. 2, the medium accommodation portion 12 is a part where a recording medium P is accommodated in the image forming apparatus 10. The recording medium P, which is accommodated in the medium accommodation portion 12, is supplied to the image forming portion 14. As the recording medium P, for example, paper is used.

Medium Discharging Portion 13

The medium discharging portion 13 illustrated in FIG. 2 is a part in which the recording medium P is discharged, in the image forming apparatus 10. The recording medium P, on which an image is formed by the image forming portion 14, is discharged to the medium discharging portion 13.

Image Forming Portion 14

The image forming portion 14 illustrated in FIG. 2 has a function of forming an image on the recording medium P sent out from the medium accommodation portion 12. As the image forming portion 14, for example, an electrophotographic type image forming portion, which forms an image on the recording medium P by using toner, is used.

In the electrophotographic type image forming portion, for example, each process of charging, exposure, development, transfer, and fixing is performed to form an image on the recording medium P. As the electrophotographic type image forming portion, each process of charging, exposure, development, and transfer may be performed to form an image on a transfer body, and an image may be formed on the recording medium P by transferring the image from the transfer body to the recording medium P and then fixing the image on the recording medium P.

All or a part of the image forming portion 14 is provided so as to be removable to the front side with respect to the image forming apparatus main body 11. A removal target, which can be removed from the image forming apparatus main body 11 (all or a part of the image forming portion 14), is attached to and detached from the image forming apparatus main body 11 so as to pass over an opposite surface 23 (see FIG. 3) of an internal part 20, which will be described later, in a state in which the exterior cover 18 is opened with respect to the image forming apparatus main body 11 (a state indicated by a two-dot chain line in FIG. 6).

Examples of the removal target include a developing machine or a unit, which includes a developer such as a toner cartridge, or toner. In this case, the developer or toner, which adheres to an opening portion of the unit that discharges the developer or toner from the unit to the main body, may fall on the exterior cover 18 in a case where the unit is attached or detached.

The example of the image forming portion is not limited to the electrophotographic type image forming portion described above, and may be, for example, an ink jet type image forming portion, and various image forming portions can be used. In the ink jet type image forming portion, for example, ink droplets are ejected from an ejection portion to the recording medium P to form an image on the recording medium P.

Transporting Mechanism 16

The transporting mechanism 16 illustrated in FIG. 2 is a mechanism that transports the recording medium P. As an example, the transporting mechanism 16 transports the recording medium P by using a transporting member 17 such as a transporting roll. The transporting member 17 may be a transporting belt or the like and may be any member as long as the transporting member can transport the recording medium P by applying a transporting force to the recording medium P.

The transporting mechanism 16 transports the recording medium P from the medium accommodation portion 12 to the image forming portion 14. Further, the transporting mechanism 16 transports the recording medium P from the image forming portion 14 to the medium discharging portion 13.

Exterior Cover 18

Figure 3:
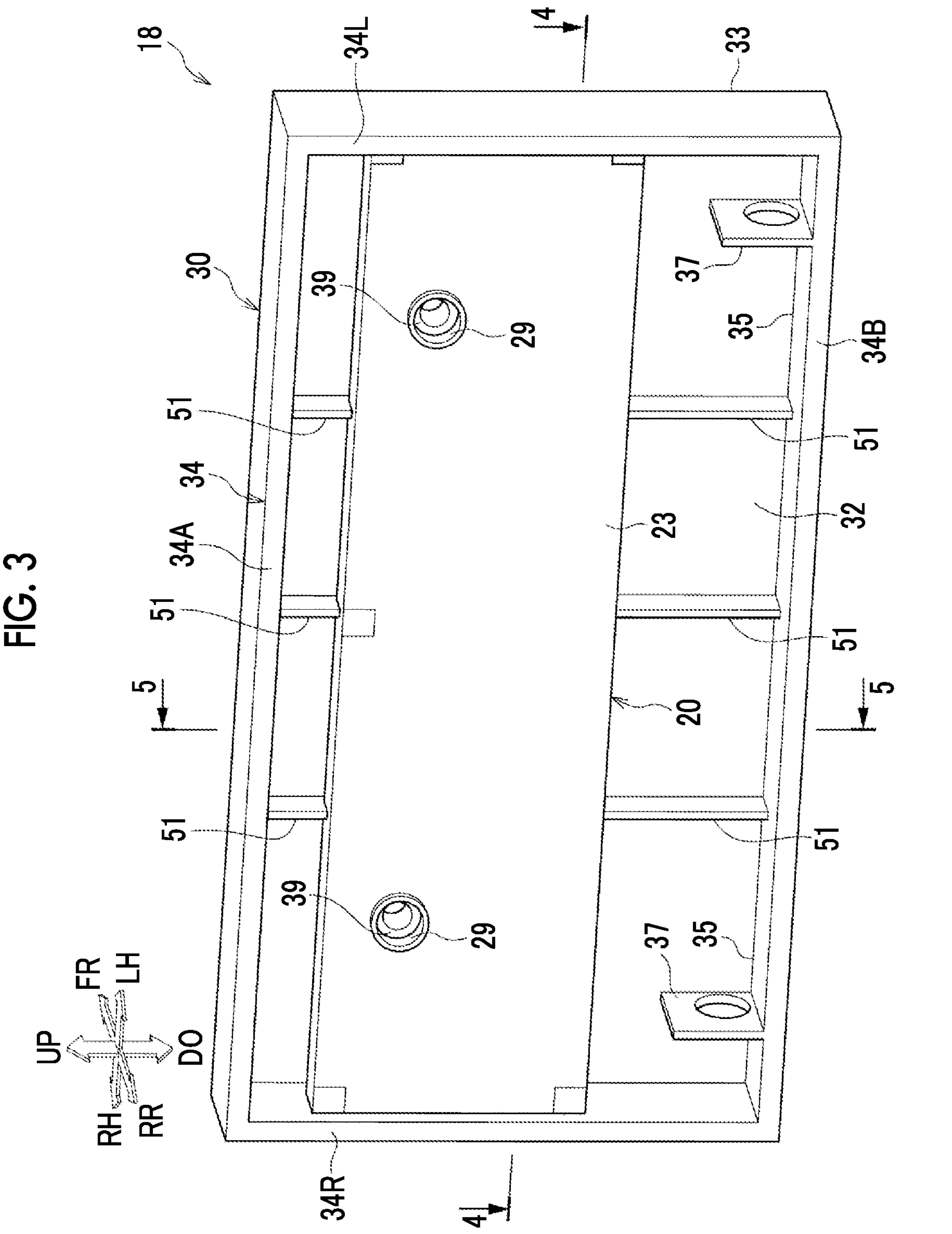
FIG. 3 is a perspective view illustrating an exterior cover according to the present exemplary embodiment.
Figure 4:
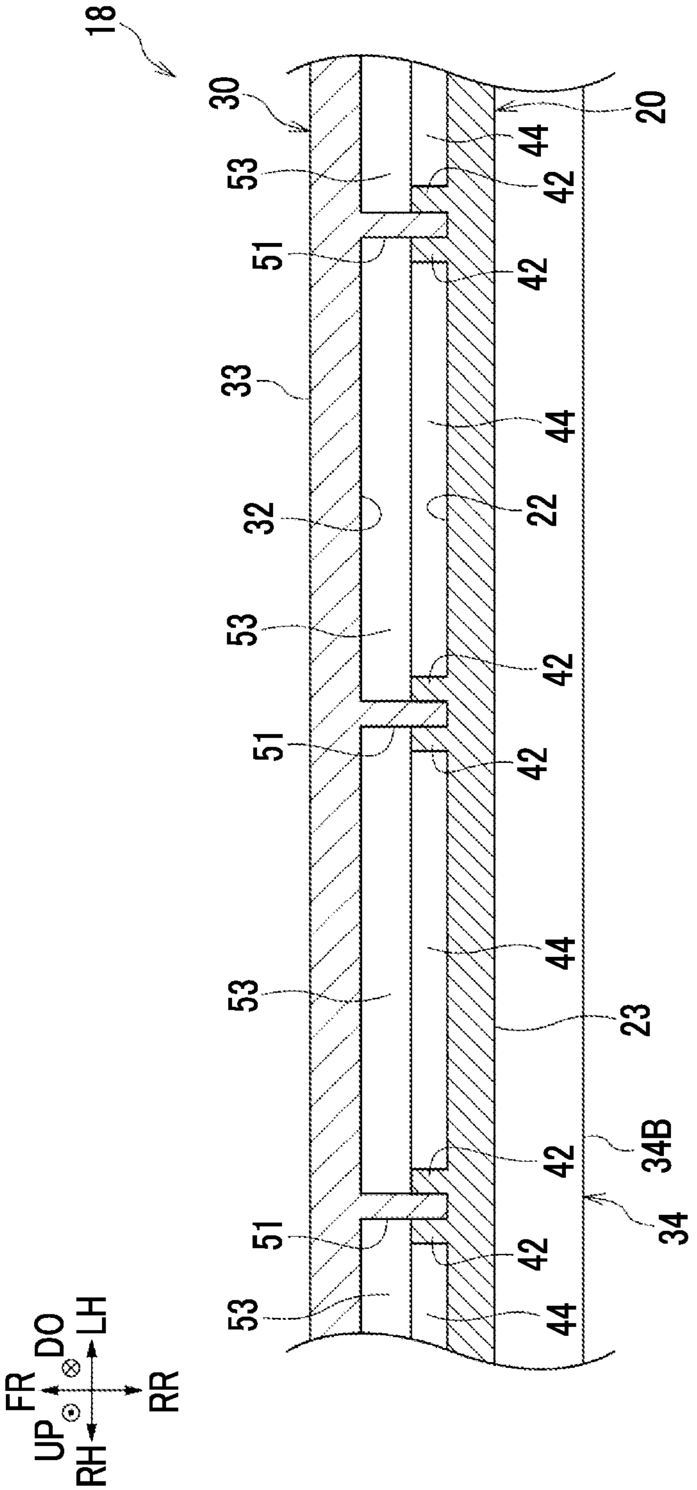
FIG. 4 is a plan cross-sectional view (a cross-sectional view taken along the line 4-4 in FIG. 3) illustrating the exterior cover according to the present exemplary embodiment.
Figure 5:
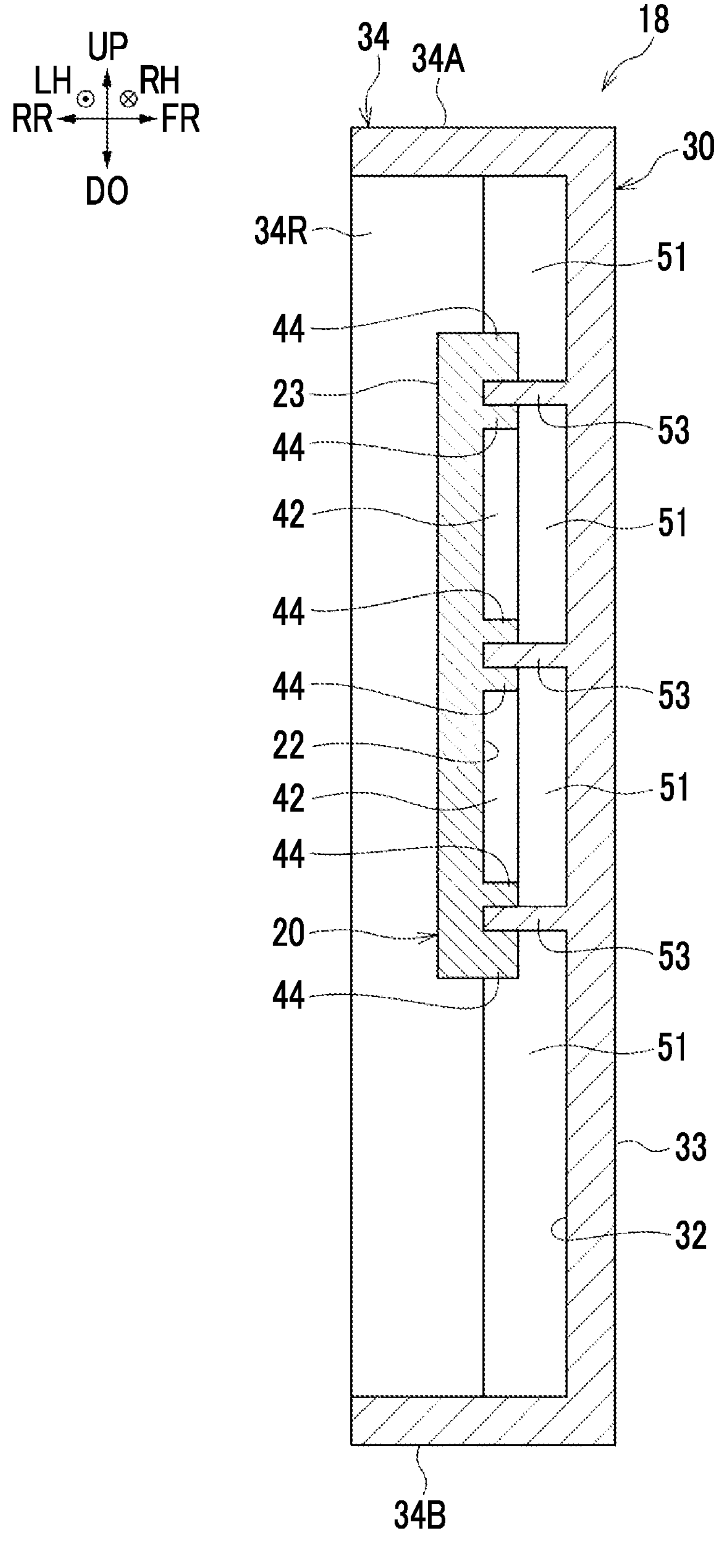
FIG. 5 is a side cross-sectional view (a cross-sectional view taken along the line 5-5 in FIG. 3) illustrating the exterior cover according to the present exemplary embodiment.
Figure 6:
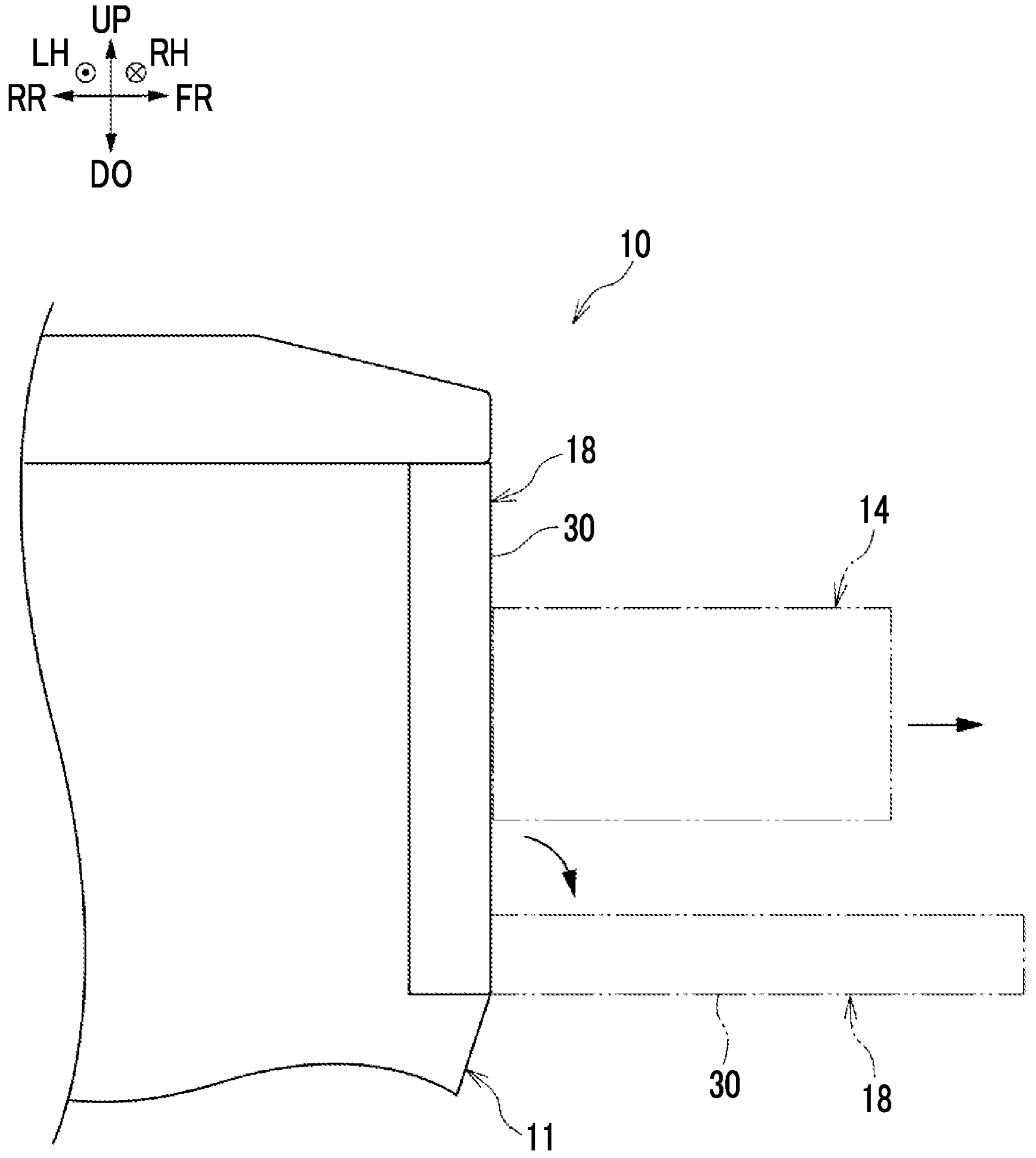
FIG. 6 is a side view illustrating a part of the image forming apparatus including the exterior cover according to the present exemplary embodiment.

FIG. 3 is a perspective view illustrating the exterior cover 18. FIG. 4 is a plan cross-sectional view (a cross-sectional view taken along the line 4-4 in FIG. 3) illustrating the exterior cover 18. FIG. 5 is a side cross-sectional view (a cross-sectional view taken along the line 5-5 in FIG. 3) illustrating the exterior cover 18. FIG. 6 is a side view illustrating a part of the image forming apparatus 10 including the exterior cover 18.

The exterior cover 18 is an example of a cover and has a function of covering a front side part of the image forming apparatus 10 (see FIG. 1). The exterior cover 18 is provided on the image forming apparatus main body 11 in an openable and closable manner (see FIG. 6).

Specifically, as illustrated in FIGS. 3, 4, and 5, the exterior cover 18 includes an exterior cover main body 30, an internal part 20, a first rib 51, a second rib 42, and a third rib. 53, and a fourth rib 44. Hereinafter, each part of the exterior cover 18 will be described.

Exterior Cover Main Body 30

Figure 7:
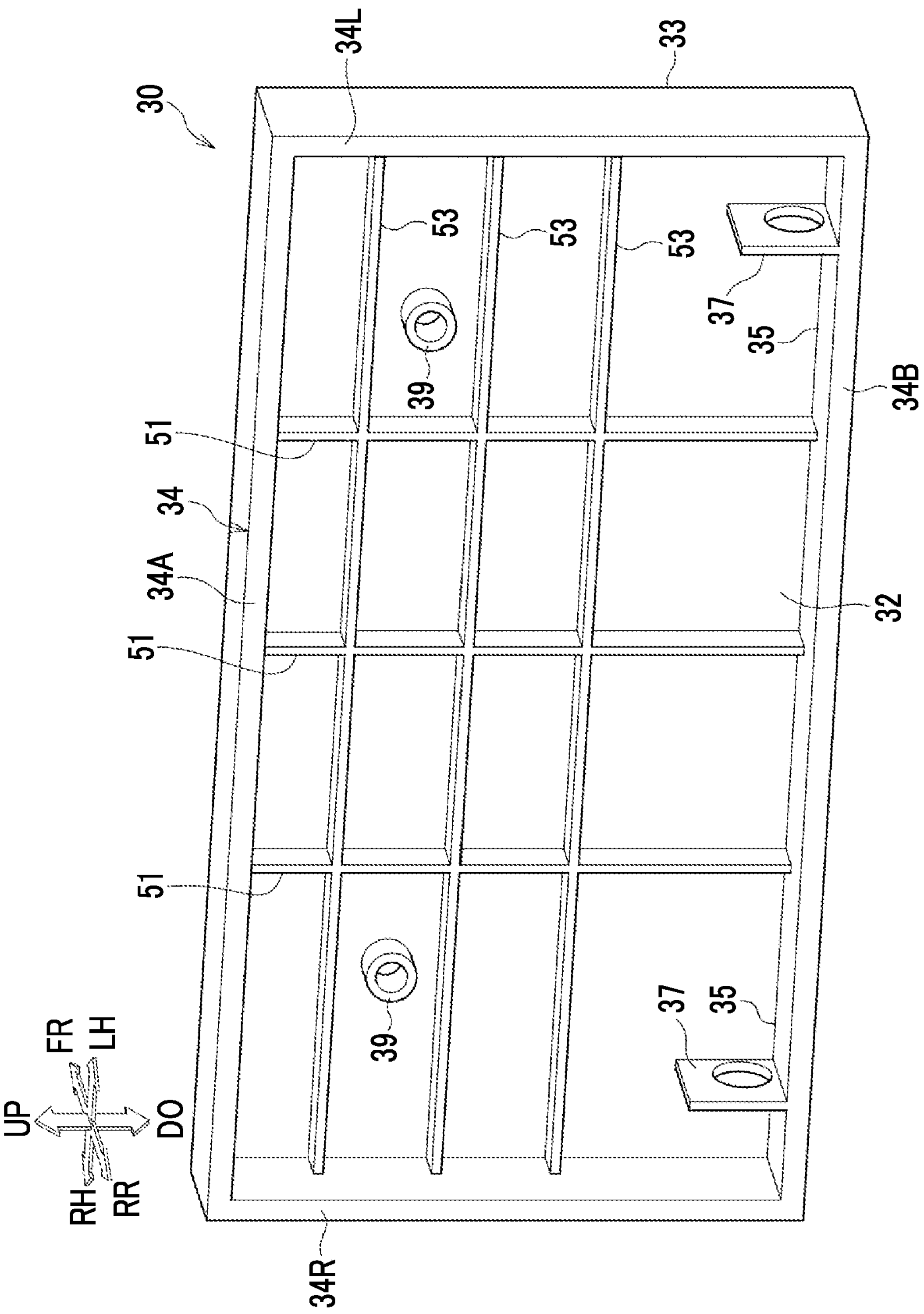
FIG. 7 is a perspective view illustrating an exterior cover main body according to the present exemplary embodiment.

The exterior cover main body 30 illustrated in FIG. 7 is an example of the cover main body and is attached to the image forming apparatus main body 11 in an openable and closable manner between a closed position (a position indicated by a solid line in FIG. 3) and an open position (a position indicated by a two-dot chain line in FIG. 3), as illustrated in FIG. 6.

In the following description of the exterior cover main body 30, up and down, left and right, front and rear directions are indicated based on a state in which the exterior cover main body 30 is closed with respect to the image forming apparatus main body 11 (that is, a state in which the exterior cover main body 30 is positioned at the closed position).

As illustrated in FIG. 4, FIG. 5, and FIG. 7, the exterior cover main body 30 has a plate shape using the front-rear direction as a thickness direction, and is formed in a rectangular shape elongated in the right-left direction in a front view. The exterior cover 18, including the first rib 51 and the third rib 53, are formed by, for example, injection molding with a resin material.

As illustrated in FIG. 7, a frame-shaped frame body 34 is formed on an inner surface 32 (specifically, a rear side surface) of the exterior cover main body 30. The frame body 34 protrudes on the rear side from the inner surface 32 of the exterior cover main body 30, and is configured with an upper side 34A, a lower side 34B, a right side 34R, and a left side 34L. The upper side 34A is formed on an upper end portion of the inner surface 32 of the exterior cover main body 30 along the right-left direction. The lower side 34B is formed on a lower end portion of the inner surface 32 of the exterior cover main body 30 along the right-left direction. The right side 34R is formed on a right end portion of the inner surface 32 of the exterior cover main body 30 along the up-down direction. The left side 34L is formed on a left end portion of the inner surface 32 of the exterior cover main body 30 along the up-down direction.

A to-be-supported portion 37, which is rotatably supported by a supporting portion (not illustrated) provided in the image forming apparatus main body 11, is provided on both sides of a corner part 35 between a lower portion of the inner surface 32 of the exterior cover main body 30 and a lower side 34B of the frame body 34, in the right-left direction. The exterior cover main body 30 is rotatable between the closed position (the position indicated by the solid line in FIG. 3) and the open position (the position indicated by the two-dot chain line in FIG. 3), using the to-be-supported portion 37 as a supporting point.

Therefore, in the exterior cover 18, the exterior cover main body 30 is rotated to the open position (the position indicated by the two-dot chain line in FIG. 3) by tilting an upper portion of the exterior cover main body 30 forward using a lower portion of the exterior cover main body 30, which is positioned at the closed position (the position indicated by the solid line in FIG. 3), as a supporting point. Further, the exterior cover main body 30 is rotated to the closed position (the position indicated by the solid line in FIG. 3) by lifting the upper portion of the exterior cover main body 30 rearward and obliquely upward using the lower portion of the exterior cover main body 30, which is positioned at the open position (the position indicated by the two-dot chain line in FIG. 3), as a supporting point.

In the closed position of the exterior cover main body 30, the inner surface 32 faces the image forming apparatus main body 11 side (that is, the rear side), and the outer surface 33 faces a side opposite to the image forming apparatus main body 11 side (that is, the front side). Further, in the open position of the exterior cover main body 30, the inner surface 32 faces the upper side and the outer surface 33 faces the lower side.

To-be-fastened portions 39, to which fastening members (not illustrated) such as screws are fastened, are formed on both sides of the inner surface 32 of the exterior cover main body 30 in the right-left direction. The to-be-fastened portion 39 is formed in a cylindrical shape, and a screw hole (not illustrated) is formed on an inner peripheral surface thereof.

First Rib 51 and Third Rib 53

The first rib 51 is an example of a first projection portion, and as illustrated in FIGS. 4 and 7, the first rib 51 protrudes from the inner surface 32 of the exterior cover main body 30 and is formed along the up-down direction as illustrated in FIG. 7. A plurality (three in the present exemplary embodiment) of the first ribs 51 are formed in the right-left direction. The first rib 51 is formed integrally with the exterior cover main body 30, for example, by injection molding with a resin material.

The first rib 51 has a function of suppressing deformation of the exterior cover main body 30, and in the present exemplary embodiment, the first rib 51 is formed to reach from one end portion (specifically, an upper end portion) of the exterior cover main body 30 to the other end portion (specifically, a lower end portion). Specifically, the first rib 51 is formed in a linear shape so as to reach from the upper side 34A to the lower side 34B of the frame body 34. That is, each of the one end portion (that is, the upper end portion) and the other end portion (that is, the lower end portion) of the first rib 51 in the length direction is connected to each of the upper side 34A and the lower side 34B of the frame body 34.

In the first rib 51, a dimension in protrusion (that is, a dimension in front-rear direction) is larger than a dimension in thickness (that is, a dimension in the right-left direction), and a dimension in length (that is, a dimension in up-down direction) is larger than the dimension in protrusion. The dimension in protrusion in the first rib 51 is smaller than a dimension in protrusion in the frame body 34. The dimension in protrusion in the first rib 51 is a dimension along the front-rear direction of a part of the exterior cover main body 30 that protrudes from the inner surface 32 to the rear side.

The third rib 53 is an example of a third projection portion, and as illustrated in FIGS. 3 and 7, the third rib 53 protrudes from the inner surface 32 of the exterior cover main body 30, is connected to the first rib 51, and is formed along the right-left direction as illustrated in FIG. 7. A plurality (three in the present exemplary embodiment) of the third ribs 53 are formed in the up-down direction. The third rib 53 is formed integrally with the exterior cover main body 30, for example, by injection molding with a resin material.

The third rib 53 has a function of suppressing deformation of the exterior cover main body 30, and in the present exemplary embodiment, the third rib 53 is formed to reach from one end portion (specifically, a right end portion) of the exterior cover main body 30 to the other end portion (specifically, a left end portion). Specifically, the third rib 53 is formed in a linear shape so as to reach from the right side 34R to the left side 34L of the frame body 34. That is, each of the one end portion (that is, the right end portion) and the other end portion (that is, the left end portion) of the third rib 53 in the length direction is connected to each of the right side 34R and the left side 34L of the frame body 34.

In the present exemplary embodiment, the third rib 53 is formed so as to intersect (specifically, orthogonal to) the first rib 51 extending in the up-down direction.

In the third rib 53, a dimension in protrusion (that is, a dimension in front-rear direction) is larger than a dimension in thickness (that is, a dimension in the up-down direction), and a dimension in length (that is, a dimension in right-left direction) is larger than the dimension in protrusion. The dimension in protrusion in the third rib 53 is smaller than a dimension in protrusion in the frame body 34.

The up-down direction is an example of a first direction. The right-left direction is an example of the second direction.

Internal Part 20

Figure 8:
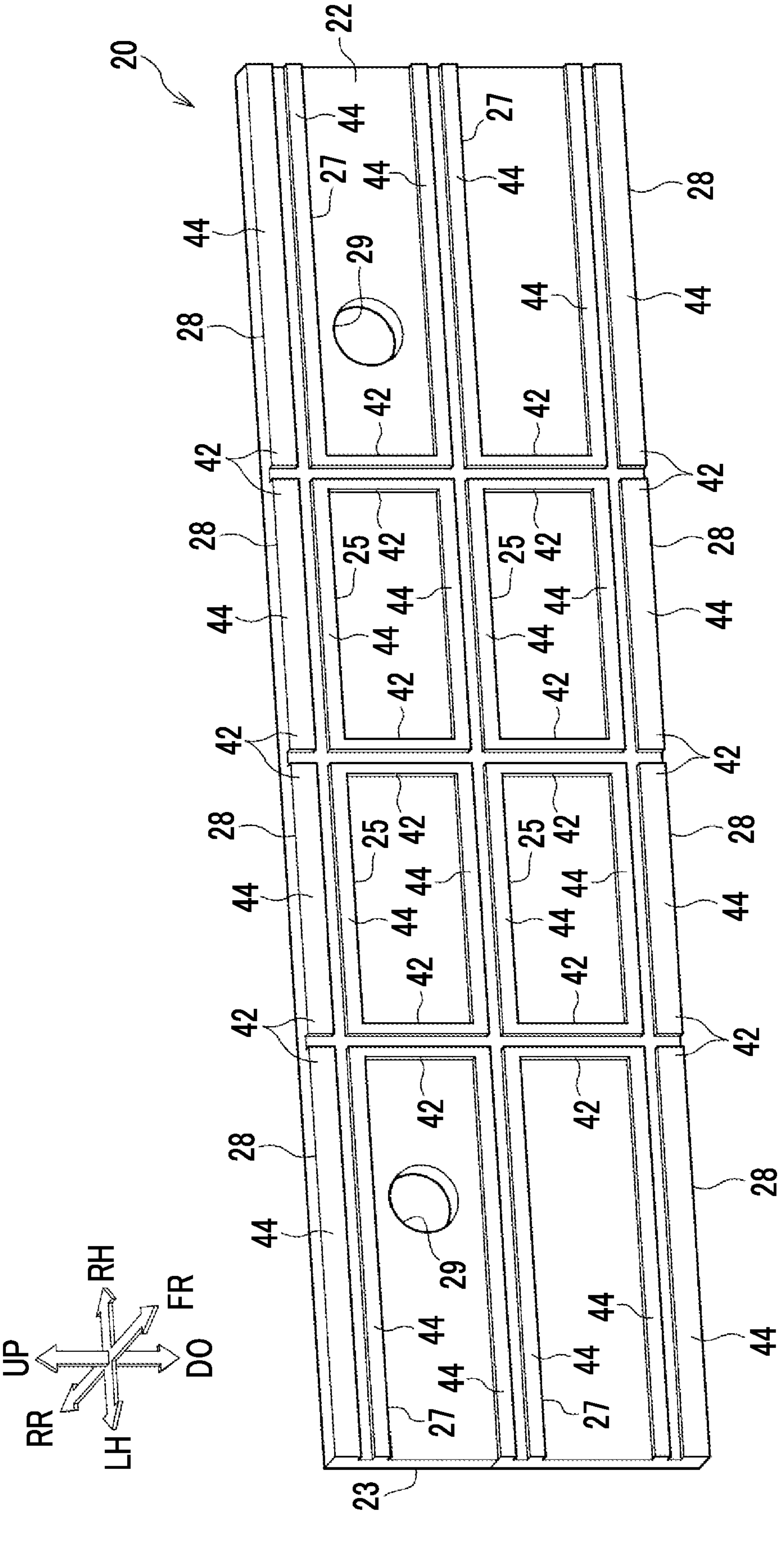
FIG. 8 is a perspective view illustrating an internal part according to the present exemplary embodiment.
Figure 9:
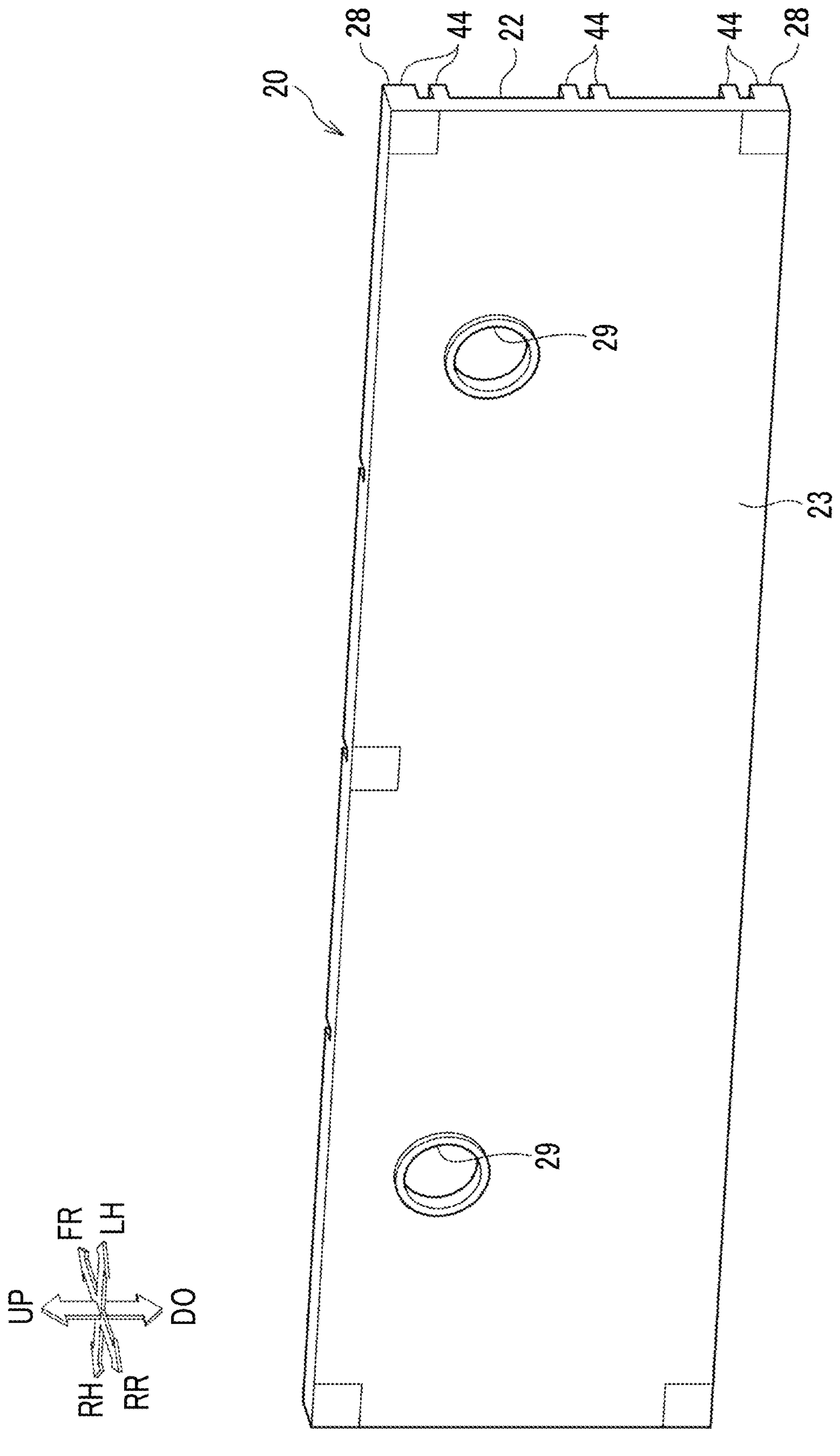
FIG. 9 is a perspective view illustrating an internal part according to the present exemplary embodiment.

The internal part 20 illustrated in FIGS. 8 and 9 is an example of an attachment portion and is a part provided inside the exterior cover main body 30. The internal part 20 is attached to the inner surface 32 of the exterior cover main body 30 as illustrated in FIG. 3 and includes a facing surface 22 that faces the inner surface 32 of the exterior cover main body 30 as illustrated in FIGS. 4 and 5. Further, the internal part 20 includes an opposite surface 23 that faces a side opposite to the facing surface 22. The opposite surface 23 is an example of an inner surface.

In the description of the internal part 20 below, up and down, left and right, front and rear directions are indicated based on a state in which the exterior cover main body 30, to which the internal part 20 is attached, is closed with respect to the image forming apparatus main body 11 (that is, a state in which the exterior cover main body 30 is positioned at the closed position).

As illustrated in FIG. 4, FIG. 5, FIG. 8, and FIG. 9, the internal part 20 has a plate shape using the front-rear direction as a thickness direction, and is formed in a rectangular shape elongated in the right-left direction in a front view. The internal part 20, including the second rib 42 and the fourth rib 44, are formed by, for example, injection molding with a resin material.

A dimension in up-down direction in the internal part 20 is smaller than a dimension between the upper side 34A and the lower side 34B in the frame body 34 of the exterior cover main body 30. A dimension in right-left direction in the internal part 20 is the same as a dimension between the right side 34R and the left side 34L in the frame body 34 of the exterior cover main body 30.

Insertion holes 29, into which the cylindrical-shaped to-be-fastened portions 39 of the exterior cover main body 30 are inserted, are formed on both sides of the internal part 20 in the right-left direction. The insertion hole 29 penetrates the internal part 20 in the thickness direction (the front-rear direction). The internal part 20 is attached to the exterior cover main body 30 by the fastening member (not illustrated) being fastened to the to-be-fastened portion 39 in a state in which the to-be-fastened portion 39 is inserted into the insertion hole 29 (see FIG. 3).

In the closed position of the exterior cover main body 30, the opposite surface 23 of the internal part 20 faces the image forming apparatus main body 11 side (that is, the rear side), and the facing surface 22 faces a side opposite to the image forming apparatus main body 11 side (that is, the front side). Further, in the open position of the exterior cover main body 30, the opposite surface 23 of the internal part 20 faces the upper side and the facing surface 22 faces the lower side.

A projection portion such as a rib positioned along the up-down direction and a projection portion such as a rib positioned along the right-left direction are not formed on the opposite surface 23 of the internal part 20.

Second Rib 42 and Fourth Rib 44

The second rib 42 is an example of a second projection portion, and as illustrated in FIGS. 4 and 8, the second rib 42 protrudes from the facing surface 22 of the internal part 20, is formed along the up-down direction, and is in contact with the first rib 51 in the right-left direction. The second rib 42 is formed integrally with the internal part 20 by, for example, injection molding with a resin material.

A plurality (six in the present exemplary embodiment) of second ribs 42 are formed in the right-left direction. Each of the plurality of second ribs 42 is in contact with each of the plurality of first ribs 51 in the right-left direction. Specifically, two second ribs 42 are formed with respect to one first rib 51, and the first rib 51 is sandwiched between the second ribs 42 in the right-left direction.

The second rib 42 is formed so as to reach from one end portion (specifically, an upper end portion) to the other end portion (specifically, a lower end portion) of the internal part 20. Specifically, the second rib 42 is separated into upper and lower parts at an intersection part between the first rib 51 and the third rib 53, and a gap is formed in the second rib 42 at the intersection part.

In the second rib 42, at least a dimension in length (that is, a dimension in up-down direction) is larger than a dimension in protrusion (that is, a dimension in front-rear direction). The dimension in protrusion in the second rib 42 is smaller than the dimension in protrusion in the first rib 51. The dimension in protrusion in the second rib 42 is a dimension along the front-rear direction of a part of the internal part 20 that protrudes from the facing surface 22 to the front side.

As described above, each of the plurality of second ribs 42 is in contact with each of the plurality of first ribs 51 in the right-left direction. Furthermore, each of the plurality of first ribs 51 is sandwiched between the plurality of second ribs 42 in the right-left direction. As described above, in the present exemplary embodiment, the first rib 51 is sandwiched between the second ribs 42 in the right-left direction, but the second rib 42 is not sandwiched between the first ribs 51 in the right-left direction.

The fourth rib 44 is an example of a fourth projection portion, and as illustrated in FIGS. 5 and 8, the fourth rib 44 protrudes from the facing surface 22 of the internal part 20, is connected to the second rib 42, and is formed along the right-left direction as illustrated in FIG. 8. As illustrated in FIG. 5, the fourth rib 44 is in contact with the third rib 53 in the up-down direction. The fourth rib 44 is formed integrally with the internal part 20 by, for example, injection molding with a resin material.

A plurality (six in the present exemplary embodiment) of the fourth ribs 44 are formed in the up-down direction. Each of the plurality of fourth ribs 44 is in contact with each of the plurality of third ribs 53 in the up-down direction. Specifically, two fourth ribs 44 are formed with respect to one third rib 53, and the third rib 53 is sandwiched between the fourth ribs 44 in the up-down direction.

The fourth rib 44 is formed so as to reach from one end portion (specifically, a right end portion) to the other end portion (specifically, a left end portion) of the internal part 20. Specifically, the fourth rib 44 is separated into right and left parts at the intersection part between the first rib 51 and the third rib 53, and a gap is formed in the fourth rib 44 at the intersection part.

In the fourth rib 44, at least a dimension in length (that is, a dimension in front-rear direction) is larger than a dimension in protrusion (that is, a dimension in right-left direction). The dimension in protrusion in the fourth rib 44 is smaller than the dimension in protrusion in the third rib 53. The dimension in protrusion in the fourth rib 44 is a dimension along the front-rear direction of a part of the internal part 20 that protrudes from the facing surface 22 to the front side.

As described above, each of the plurality of fourth ribs 44 is in contact with each of the plurality of third ribs 53 in the up-down direction. Furthermore, each of the plurality of third ribs 53 is sandwiched between the plurality of fourth ribs 44 in the up-down direction. As described above, in the present exemplary embodiment, the third rib 53 is sandwiched between the fourth ribs 44 in the up-down direction, but the fourth rib 44 is not sandwiched between the third ribs 53 in the up-down direction.

As illustrated in FIG. 8, four frame-shaped protrusion parts 25 are formed at the center part of the facing surface 22 of the internal part 20 by the second rib 42 and the fourth rib 44. Further, two U-shaped protrusion parts 27 are formed on the right side and the left side of the four protrusion parts 25, respectively. Further, protrusion parts 28 in which the second ribs 42 and the fourth ribs 44 are integrated are formed at the upper end portion and the lower end portion of the internal part 20 along the right-left direction.

Operations According to Present Exemplary Embodiment

In the present exemplary embodiment, the second rib 42, which protrudes from the facing surface 22 of the internal part 20 and is formed along the up-down direction, is in contact with the first rib 51 in the right-left direction as illustrated in FIG. 4.

Figure 10:
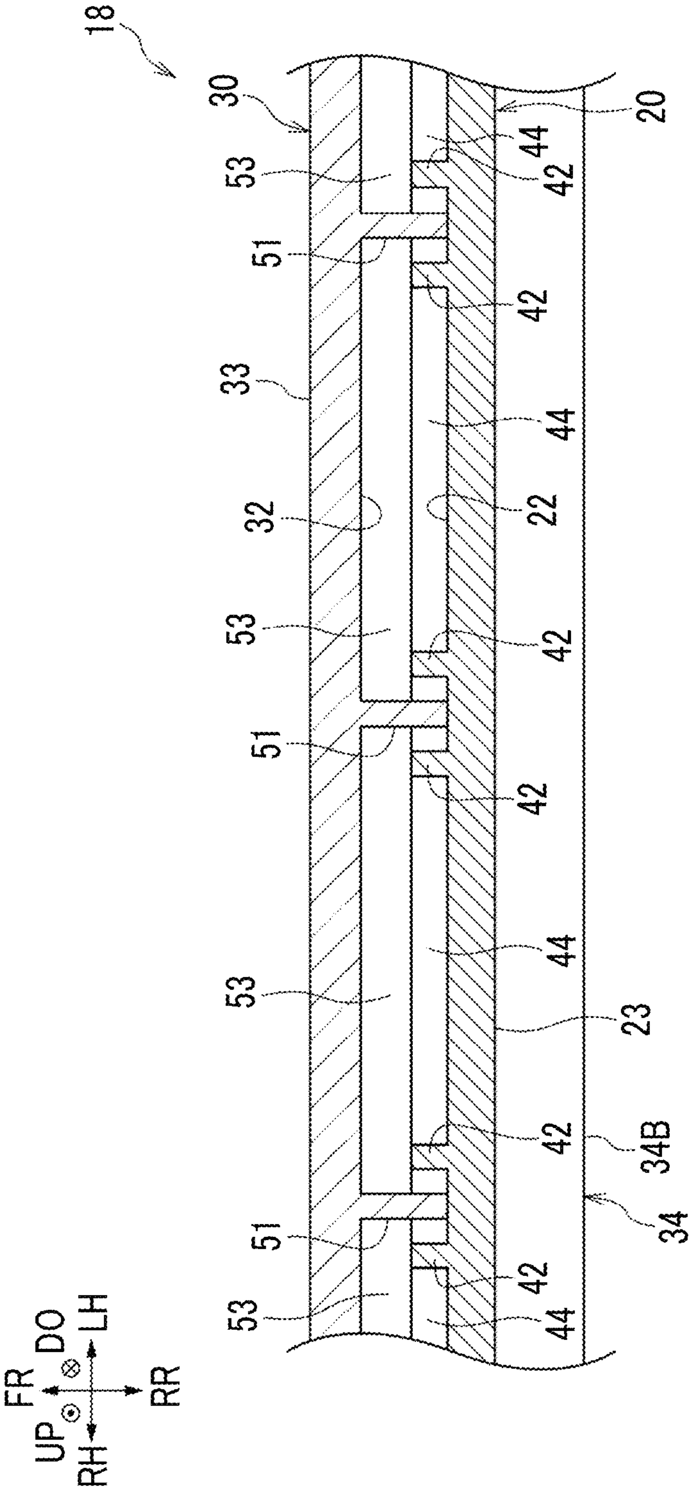
FIG. 10 Prior Art
FIG. 10 is a plan cross-sectional view illustrating an exterior cover according to a comparative embodiment.

Here, as illustrated in FIG. 10, in a case where the second rib 42 is not in contact with the first rib 51 in the right-left direction (hereinafter referred to as a mode A), the first rib 51 collapses in the right-left direction, and the exterior cover main body 30 is likely to be deformed in a case where an external force is applied to the exterior cover main body 30.

In contrast, in the present exemplary embodiment, as described above, since the second rib 42 is in contact with the first rib 51 in the right-left direction, the first rib 51 is supported in the right-left direction in a case where an external force is applied to the exterior cover main body 30. As a result, according to the present exemplary embodiment, in a case where the exterior cover 18 is opened and closed with respect to the image forming apparatus main body 11 or the like, the deformation of the exterior cover main body 30 is suppressed as compared with the case of the mode A.

Further, in the present exemplary embodiment, the first rib 51 is sandwiched between the second ribs 42 in the right-left direction. Therefore, the first rib 51 is supported on both sides in the right-left direction in a case where an external force is applied to the exterior cover main body 30, and the deformation of the exterior cover main body 30 is suppressed as compared with the case where the second rib 42 is in contact with the first rib 51 only on one side in the right-left direction.

Further, in the present exemplary embodiment, the first rib 51 is sandwiched between the second ribs 42 in the right-left direction, but the second rib 42 is not sandwiched between the first ribs 51 in the right-left direction. Therefore, the number of first ribs 51 is reduced as compared with a case where the second rib 42 is sandwiched between the first ribs 51 in the right-left direction.

Figure 13:
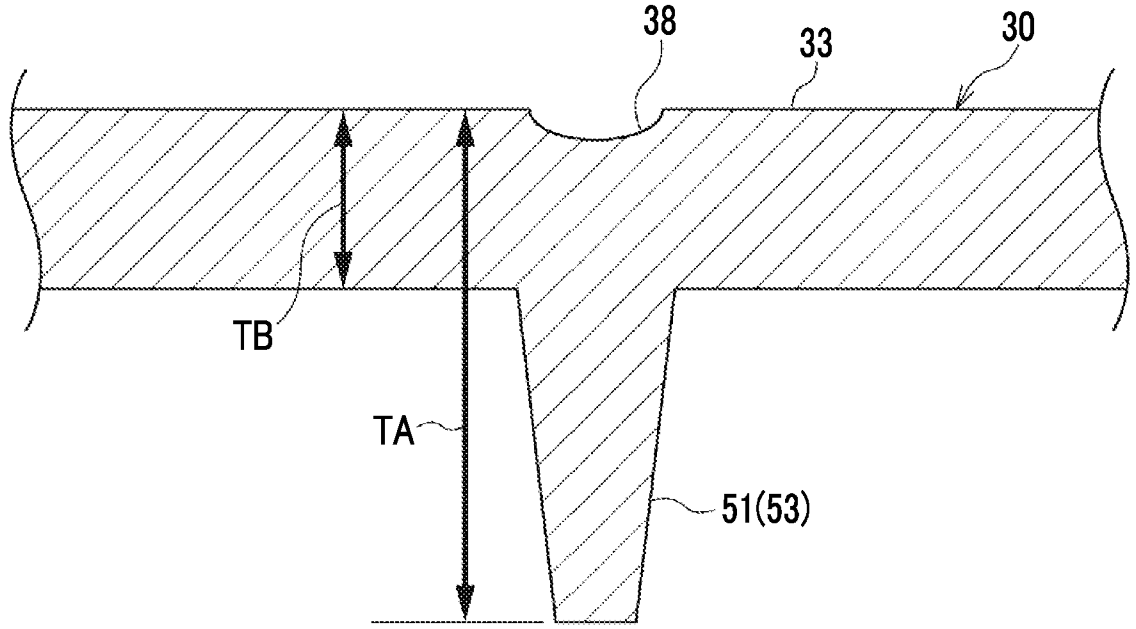
FIG. 13 is a description view illustrating a recess portion (a sink mark) formed on an outer surface of the exterior cover main body according to the present exemplary embodiment.

Here, for example, in a case where the exterior cover main body 30 is formed by injection molding with a resin material, as illustrated in FIG. 13, since the plate thickness of a part where the first rib 51 is formed (see a symbol TA) is larger than the plate thickness of a part where the first rib 51 is not formed (see a symbol TB), a recess portion 38 (so-called a sink mark) may be formed on the outer surface 33 of the exterior cover main body 30 due to a difference in contraction rate during cooling.

Therefore, according to the present exemplary embodiment, as compared with the case where the second rib 42 is sandwiched between the first ribs 51 in the right-left direction, the formation of the recess portion 38 on the outer surface 33 of the exterior cover main body 30 is suppressed as a result of reducing the number of first ribs 51 in the exterior cover main body 30.

Further, in the present exemplary embodiment, each of the plurality of second ribs 42 is in contact with each of the plurality of first ribs 51 in the right-left direction. Furthermore, each of the plurality of first ribs 51 is sandwiched between the plurality of second ribs 42 in the right-left direction. Therefore, the deformation of the exterior cover main body 30 is suppressed as compared with a case where only one second rib 42 is in contact with the first rib 51 in the right-left direction.

Further, in the present exemplary embodiment, the fourth rib 44, which protrudes from the facing surface 22 of the internal part 20, is connected to the second rib 42, and is formed along the right-left direction, is in contact with the third rib 53 in the up-down direction as illustrated in FIG. 5.

Figure 11:
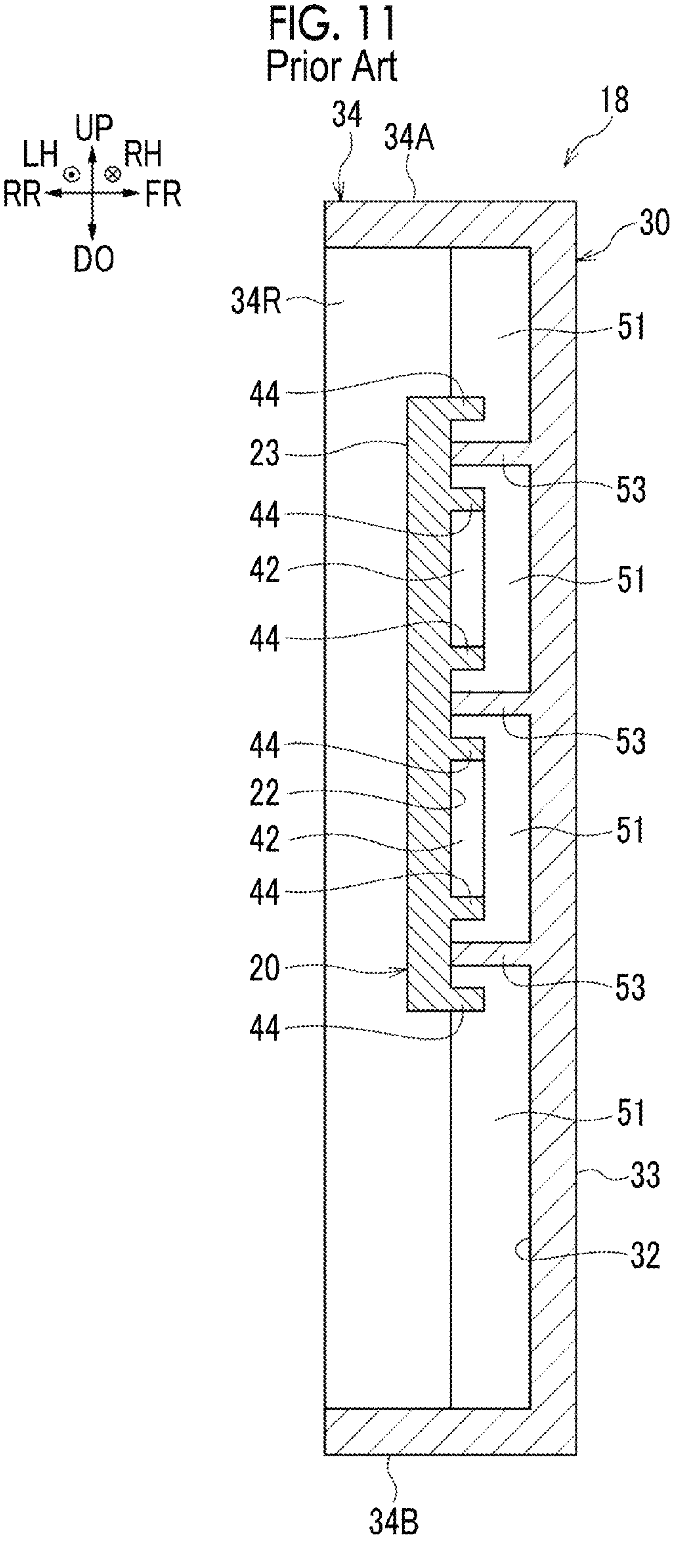
FIG. 11 Prior Art
FIG. 11 is a side cross-sectional view illustrating the exterior cover according to the comparative embodiment.

Here, as illustrated in FIG. 11, in a case where the fourth rib 44 is not in contact with the third rib 53 in the up-down direction (hereinafter referred to as a mode B), the third rib 53 collapses in the up-down direction, and the exterior cover main body 30 is likely to be deformed in a case where an external force is applied to the exterior cover main body 30.

In contrast, in the present exemplary embodiment, as described above, since the fourth rib 44 is in contact with the third rib 53 in the up-down direction, the third rib 53 is supported in the up-down direction in a case where an external force is applied to the exterior cover main body 30. As a result, according to the present exemplary embodiment, in a case where the exterior cover 18 is opened and closed with respect to the image forming apparatus main body 11 or the like, the deformation of the exterior cover main body 30 is suppressed as compared with the case of the mode B.

Figure 12:
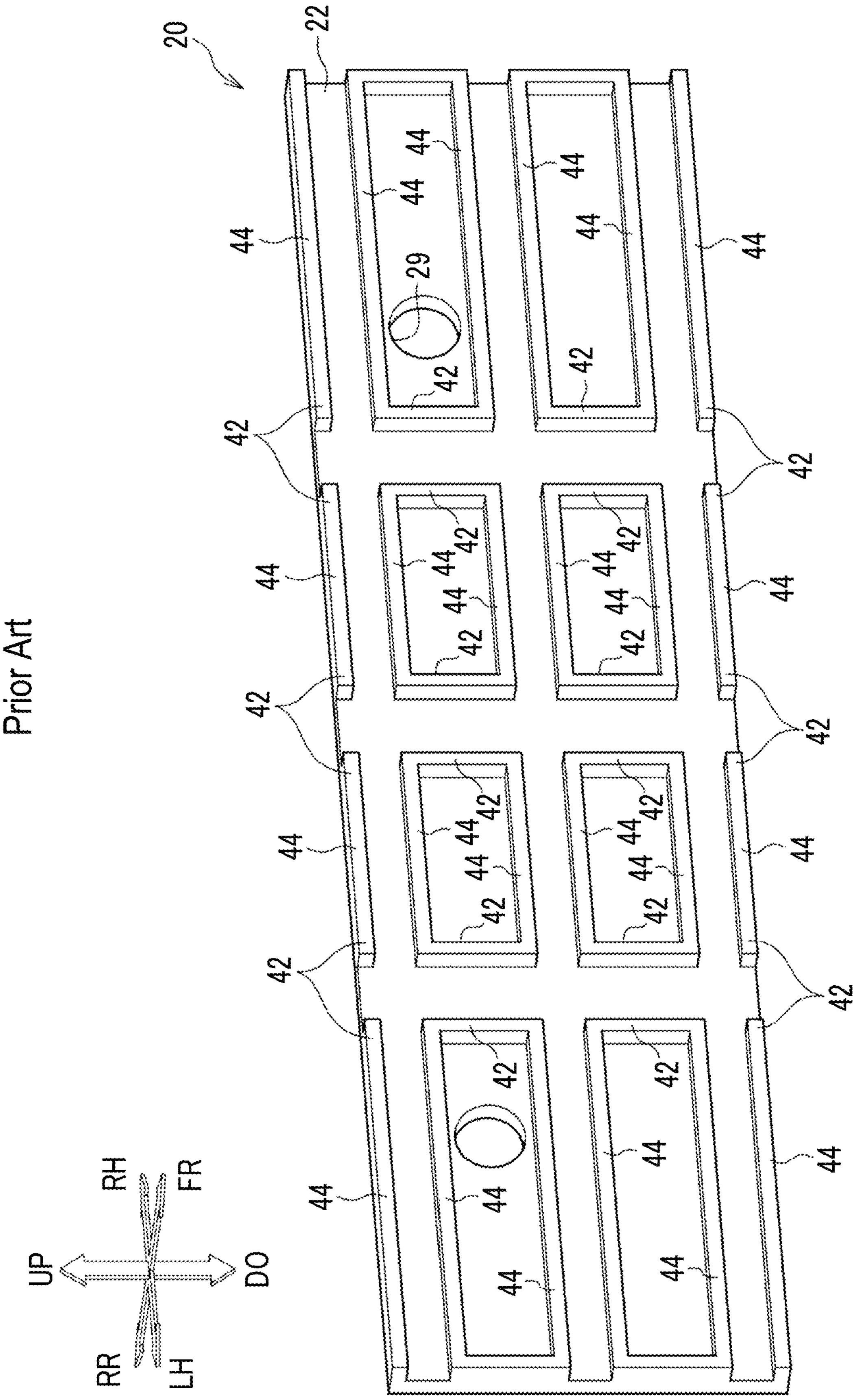
FIG. 12 Prior Art
FIG. 12 is a perspective view illustrating an internal part according to the comparative embodiment.

In the internal parts 20 in configurations illustrated in FIGS. 10 and 11, the second ribs 42 are arranged in the right-left direction at intervals larger than the dimension in thickness of the first rib 51, and the fourth ribs 44 are arranged in the up-down direction at intervals larger than the dimension in thickness of the third rib 53 as illustrated in FIG. 12.

Further, in the present exemplary embodiment, since the third rib 53 is sandwiched between the fourth ribs 44 in the up-down direction, the third rib 53 is supported on both sides in the up-down direction in a case where an external force is applied to the exterior cover main body 30, and the deformation of the exterior cover main body 30 is suppressed as compared with the case where the fourth rib 44 is in contact with the third rib 53 only on one side in the up-down direction.

Further, in the present exemplary embodiment, the third rib 53 is sandwiched between the fourth ribs 44 in the up-down direction, but the fourth rib 44 is not sandwiched between the third ribs 53 in the up-down direction. Therefore, the number of third ribs 53 is reduced as compared with a case where the fourth rib 44 is sandwiched between the third ribs 53 in the up-down direction.

Here, for example, in a case where the exterior cover main body 30 is formed by injection molding with a resin material, as illustrated in FIG. 13, since the plate thickness of a part where the third rib 53 is formed (see a symbol TA) is larger than the plate thickness of a part where the third rib 53 is not formed (see a symbol TB), a recess portion 38 (so-called a sink mark) may be formed on the outer surface 33 of the exterior cover main body 30 due to a difference in contraction rate during cooling.

Therefore, according to the present exemplary embodiment, as compared with the case where the fourth rib 44 is sandwiched between the third ribs 53 in the up-down direction, the formation of the recess portion 38 on the outer surface 33 of the exterior cover main body 30 is suppressed as a result of reducing the number of third ribs 53 in the exterior cover main body 30.

Further, in the present exemplary embodiment, each of the plurality of fourth ribs 44 is in contact with each of the plurality of third ribs 53 in the up-down direction. Furthermore, each of the plurality of third ribs 53 is sandwiched between the plurality of fourth ribs 44 in the up-down direction. Therefore, the deformation of the exterior cover main body 30 is suppressed as compared with a case where only one fourth rib 44 is in contact with the third rib 53 in the up-down direction.

Further, in the present exemplary embodiment, a projection portion such as a rib positioned along the up-down direction and a projection portion such as a rib positioned along the right-left direction are not formed on the opposite surface 23 of the internal part 20. Therefore, as compared with the case where the projection portion such as a rib positioned along the up-down direction and the projection portion such as a rib positioned along the right-left direction are formed on the opposite surface 23 of the internal part 20, the roughness on the opposite surface 23 is reduced, thereby the opposite surface 23 is easy to clean in a case where cleaning the opposite surface 23 of the internal part 20 in a case where the exterior cover 18 is opened with respect to the image forming apparatus main body 11.

Modification Example of Application Target of Exterior Cover 18

In the present exemplary embodiment, the exterior cover 18 is applied to the housing 15 of the image forming apparatus 10, but the present exemplary embodiment is not limited thereto. The exterior cover 18 may be applied to, for example, a box body or the like, in which an element having a predetermined function (specifically, a part, a device, or the like) is not accommodated, and can be applied to various application targets.

Further, a target to which the exterior cover 18 is applied is not limited to the image forming apparatus 10, and for example, the target can be applied to an image reading apparatus such as a scanner, a pre-processing apparatus such as a paper feeder, a post-processing apparatus such as a folding apparatus, and other apparatuses such as office machines, medical machines, and analytical machines. That is, the exterior cover 18 can be attached to various attachment targets.

Modification Example of Exterior Cover Main Body 30

In the present exemplary embodiment, the exterior cover main body 30 is in an openable and closable manner using the lower portion as a supporting point with respect to the image forming apparatus main body 11, but the present exemplary embodiment is not limited thereto. The exterior cover main body 30 may have, for example, a configuration that is opened and closed by using one of the left and right parts as a supporting point (that is, a configuration of lateral opening) and rotating the other part. Further, the exterior cover main body 30 may be configured to be opened and closed by moving the lower portion up and down using the upper portion as a supporting point.

Further, the exterior cover main body 30 may be configured to be opened and closed by linear movement of a slide or the like. Further, the exterior cover main body 30 may be configured to be attached to and detached from the attachment target.

Further, the exterior cover main body 30 may be configured not to be opened and closed with respect to the attachment target. Therefore, the exterior cover main body 30 may have a configuration fixed to the attachment target.

Modification Example of Internal Part 20

In the present exemplary embodiment, the internal part 20 is attached to the exterior cover main body 30 by the fastening member (not illustrated) being fastened to the to-be-fastened portion 39 in a state in which the to-be-fastened portion 39 is inserted into the insertion hole 29 (see FIG. 3) but the present exemplary embodiment is not limited thereto. For example, the internal part 20 may be attached to the exterior cover main body 30 by an attachment unit such as a snap fit, and various attachment units can be used.

In the present exemplary embodiment, a projection portion such as a rib positioned along the up-down direction and a projection portion such as a rib positioned along the right-left direction are not formed on the opposite surface 23 of the internal part 20, but the pre exemplary embodiment is not limited thereto. A configuration may be used in which at least one of a projection portion such as a rib positioned along the up-down direction or a projection portion such as a rib positioned along the right-left direction is formed on the opposite surface 23 of the internal part 20. That is, a configuration may be used in which at least one of a projection portion such as a rib positioned along the up-down direction or a projection portion such as a rib positioned along the right-left direction is not formed on the opposite surface 23 of the internal part 20.

Furthermore, a configuration may be used in which both a projection portion such as a rib positioned along the up-down direction and a projection portion such as a rib positioned along the right-left direction are formed on the opposite surface 23 of the internal part 20.

Modification Example of First Rib 51 and Third Rib 53

In the present exemplary embodiment, the first rib 51 is formed in a linear shape so as to reach from the upper end portion to the lower end portion of the exterior cover main body 30, but the present exemplary embodiment is not limited thereto. A configuration may be used in which the first rib 51 is, for example, disposed at a position partially displaced in the right-left direction and is formed to reach from the upper end portion to the lower end portion of the cover main body as a whole.

Further, a configuration may be used in which the first rib 51 does not have to reach from the upper end portion to the lower end portion of the cover main body and is formed in a part of the exterior cover main body 30 in the up-down direction. Even in this case, the dimension in length (the dimension in up-down direction) in the first rib 51 is desired to be, for example, at least longer than the dimension in protrusion and the dimension in thickness in the first rib 51. Further, for example, at least one of one end portion and the other end portion in the length direction (specifically, the up-down direction) of the first rib 51 is desired to be connected to a projection portion extending in a direction different from the length direction.

In the present exemplary embodiment, the third rib 53 is formed in a linear shape so as to reach from the right end portion to the left end portion of the exterior cover main body 30, but the present exemplary embodiment is not limited thereto. The third rib 53 may be, for example, disposed at a position partially displaced in the up-down direction and may be formed to reach from the right end portion to the left end portion of the exterior cover main body 30 as a whole.

Further, the third rib 53 may not have to reach from the right end portion to the left end portion of the cover main body and may be formed in a part of the exterior cover main body 30 in the right-left direction. Even in this case, the dimension in length (the dimension in right-left direction) in the third rib 53 is desired to be, for example, at least longer than the dimension in protrusion and the dimension in thickness in the third rib 53. Further, for example, at least one of one end portion and the other end portion in the length direction (specifically, the right-left direction) of the third rib 53 may be connected to a projection portion extending in a direction different from the length direction.

Further, in the present exemplary embodiment, the second rib 42 is not sandwiched between the first ribs 51 in the right-left direction, but the present exemplary embodiment is not limited thereto. For example, as illustrated in FIG. 14, a configuration may be used in which one of the two second ribs 42, in which the first rib 51 is sandwiched in the right-left direction, is sandwiched between the first ribs 51 in the right-left direction.

Figure 14:
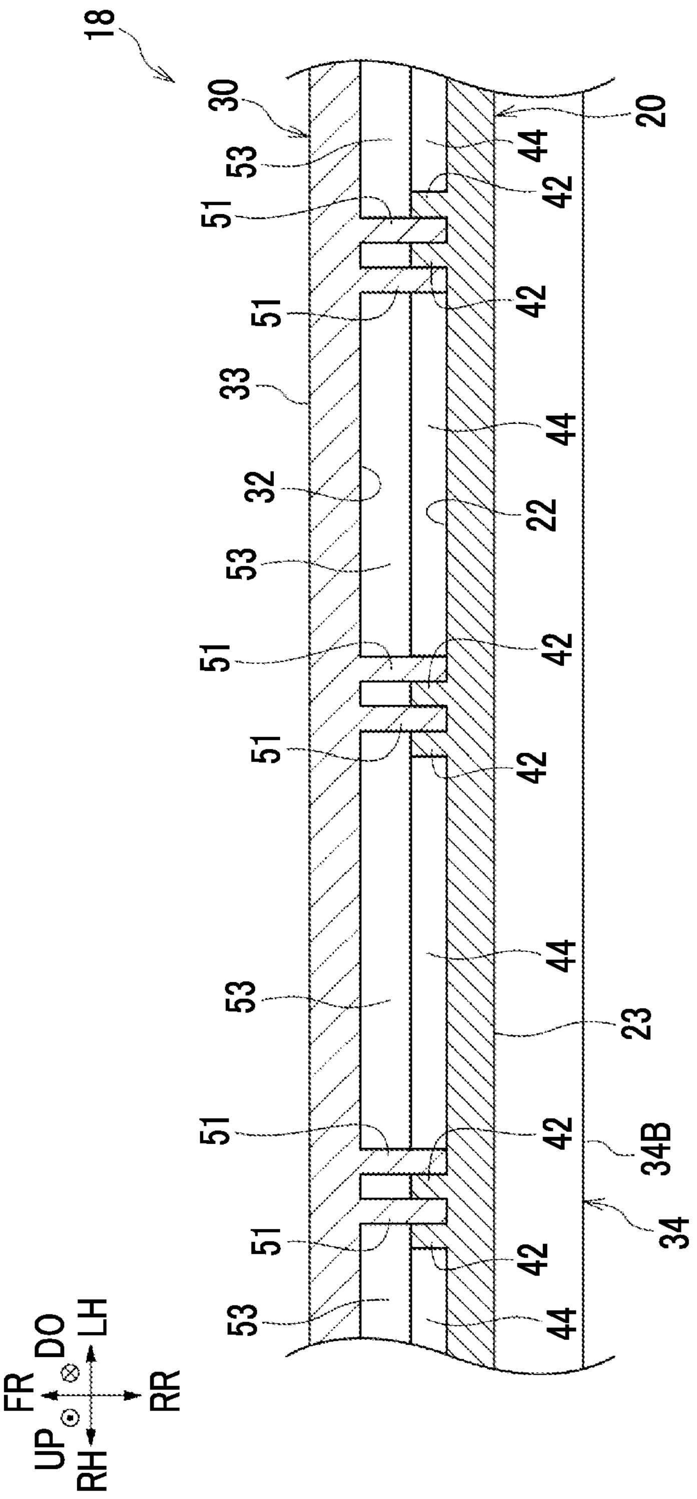
FIG. 14 is a plan cross-sectional view illustrating an exterior cover according to a modification example.

According to the configuration in FIG. 14, as compared with a case where only the first rib 51 is sandwiched between the second ribs 42 in the right-left direction, the first rib 51 is less likely to collapse, and the deformation of the exterior cover main body 30 is suppressed.

Figure 15:
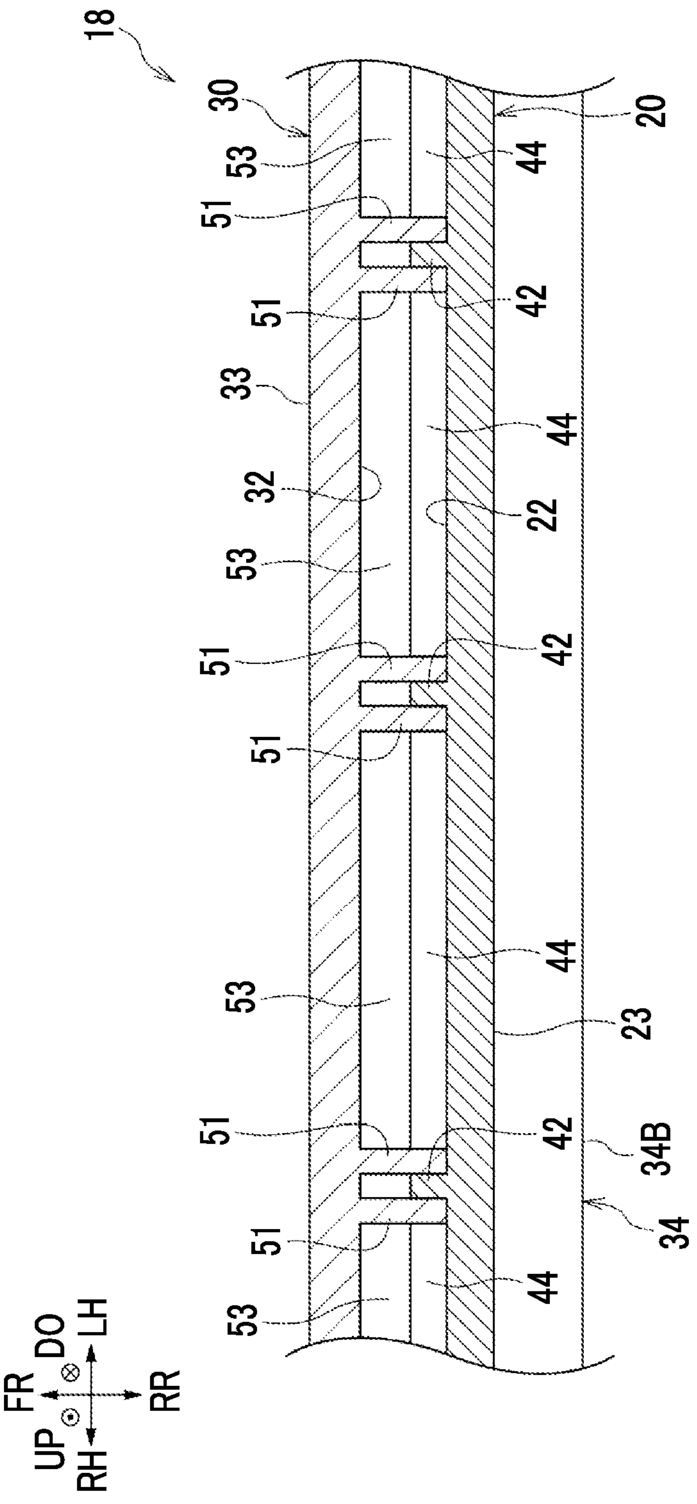
FIG. 15 is a plan cross-sectional view illustrating the exterior cover according to the modification example.

Further, as illustrated in FIG. 15, a configuration may be used in which the second rib 42 is sandwiched between the first ribs 51 in the right-left direction in replace with a configuration in which the first rib 51 is sandwiched between the second ribs 42 in the right-left direction.

According to the configuration in FIG. 15, the deformation of the exterior cover main body 30 is suppressed as compared with a case where the first rib 51 is in contact with the second rib 42 on only one side in the right-left direction.

Further, in the present exemplary embodiment, the fourth rib 44 is not sandwiched between the third ribs 53 in the up-down direction, but the present exemplary embodiment is not limited thereto. For example, as illustrated in FIG. 16, a configuration may be used in which one of the two fourth ribs 44, in which the third rib 53 is sandwiched in the up-down direction, is sandwiched between the third ribs 53 in the up-down direction.

Figure 16:
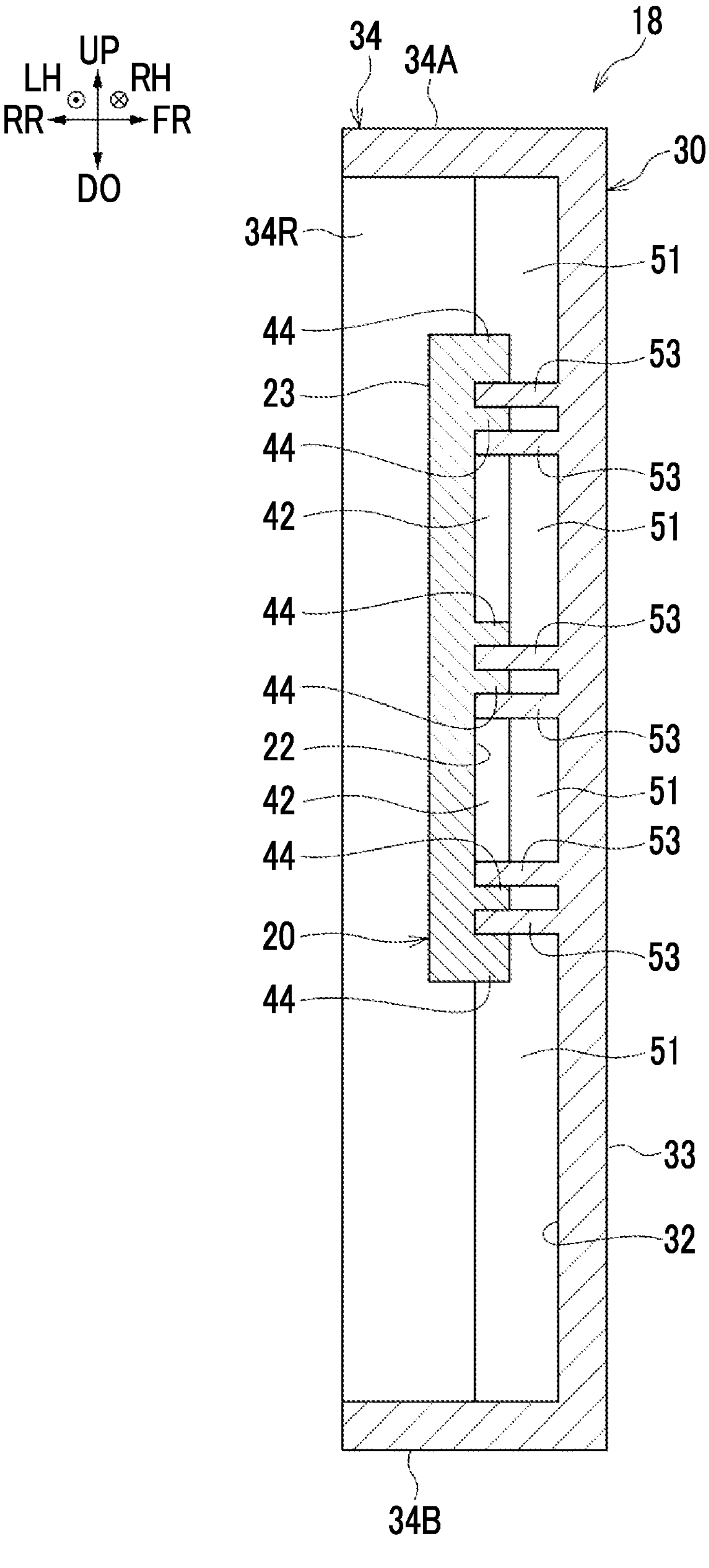
FIG. 16 is a side cross-sectional view illustrating the exterior cover according to the modification example.

According to the configuration in FIG. 16, as compared with a case where only the third rib 53 is sandwiched between the fourth ribs 44 in the up-down direction, the third rib 53 is less likely to collapse, and the deformation of the exterior cover main body 30 is suppressed.

Figure 17:
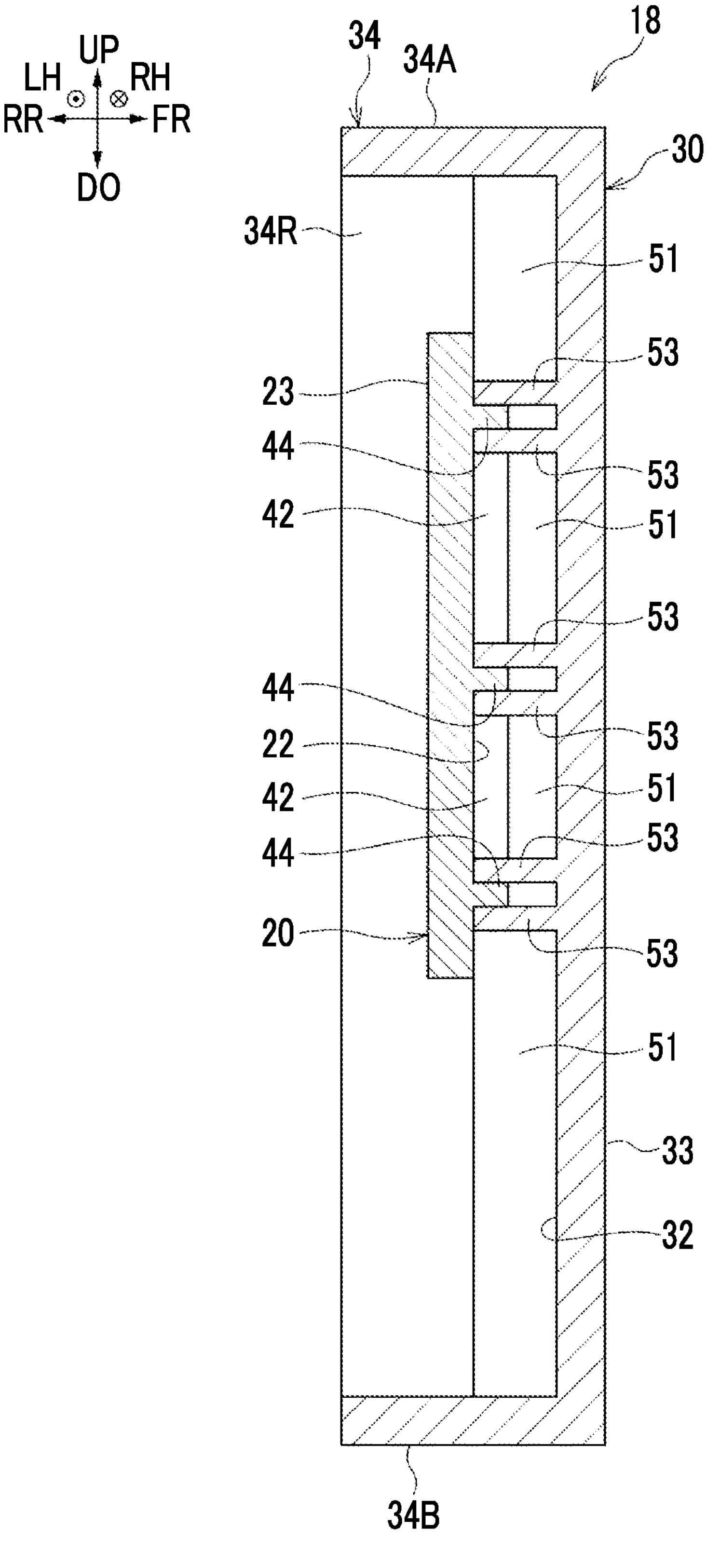
FIG. 17 is a side cross-sectional view illustrating the exterior cover according to the modification example.

Further, as illustrated in FIG. 17, a configuration may be used in which the fourth rib 44 is sandwiched between the third ribs 53 in the up-down direction in replace with a configuration in which the third rib 53 is sandwiched between the fourth ribs 44 in the up-down direction.

According to the configuration in FIG. 17, the deformation of the exterior cover main body 30 is suppressed as compared with a case where the third rib 53 is in contact with the fourth rib 44 on only one side in the up-down direction.

Modification Example of Second Rib 42 and Fourth Rib 44

In the present exemplary embodiment, the second rib 42 is formed to reach from the upper end portion to the lower end portion of the internal part 20, but the present exemplary embodiment is not limited thereto. The second rib 42 may not reach from the upper end portion to the lower end portion of the internal part 20 and may be formed in a part of the internal part 20 in the up-down direction. Even in this case, the dimension in length (the dimension in up-down direction) in the second rib 42 is, for example, at least longer than the dimension in protrusion in the second rib 42. Further, for example, at least one of one end portion and the other end portion in the length direction (specifically, the up-down direction) of the second rib 42 may be connected to a projection portion extending in a direction different from the length direction.

In the present exemplary embodiment, the fourth rib 44 is formed to reach from the right end portion to the left end portion of the internal part 20, but the present exemplary embodiment is not limited thereto. The fourth rib 44 may not reach from the right end portion to the left end portion of the internal part 20 and may be formed in a part of the internal part 20 in the right-left direction. Even in this case, the dimension in length (the dimension in right-left direction) in the fourth rib 44 is, for example, at least longer than the dimension in protrusion in the fourth rib 44. Further, for example, at least one of one end portion and the other end portion in the length direction (specifically, the right-left direction) of the fourth rib 44 may be connected to a projection portion extending in a direction different from the length direction.

Figure 18:
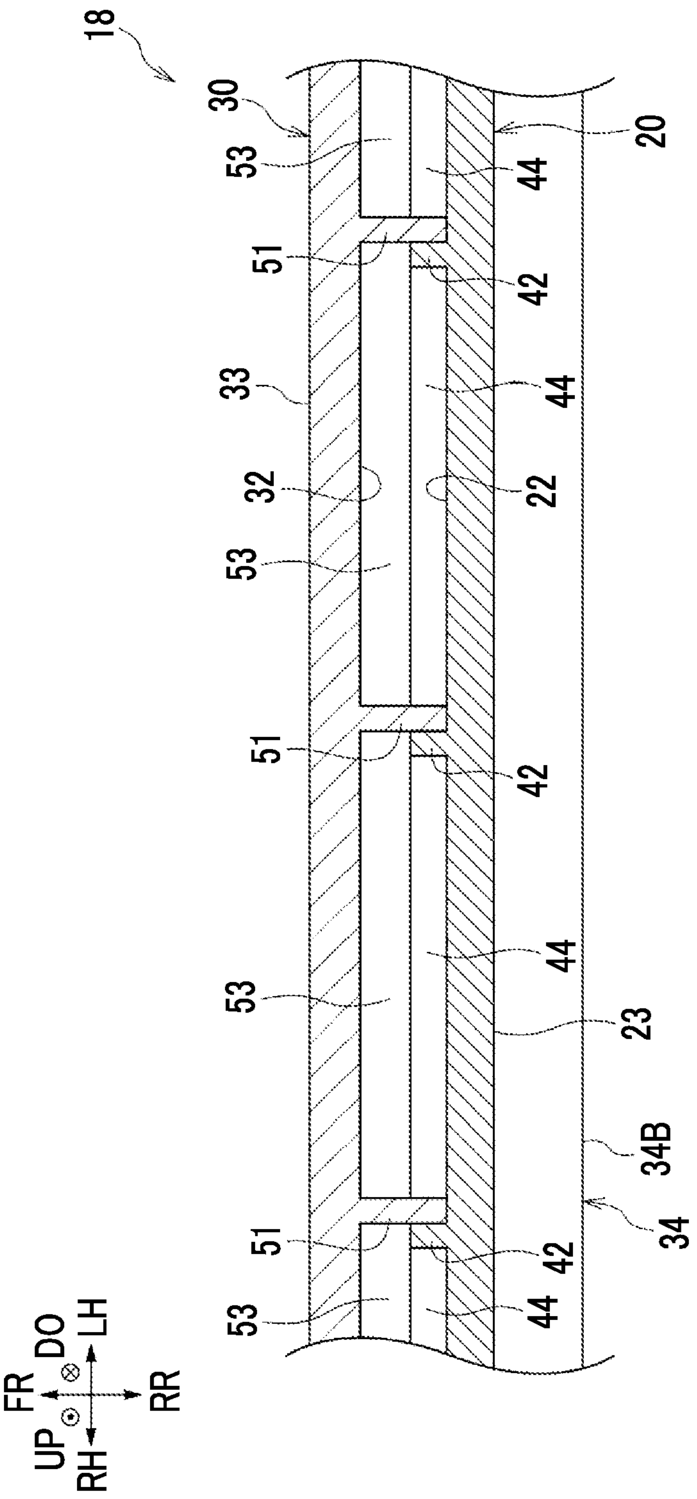
FIG. 18 is a plan cross-sectional view illustrating the exterior cover according to the modification example.

Further, in the present exemplary embodiment, the first rib 51 is sandwiched between the second ribs 42 in the right-left direction, but the present exemplary embodiment is not limited thereto. As illustrated in FIG. 18, a configuration may be used in which the second rib 42 is in contact with the first rib 51 from one side in the right-left direction. In the configuration illustrated in FIG. 18, each of the second ribs 42 is in contact with each of the first ribs 51 from the right side (that is, the same side).

Figure 19:
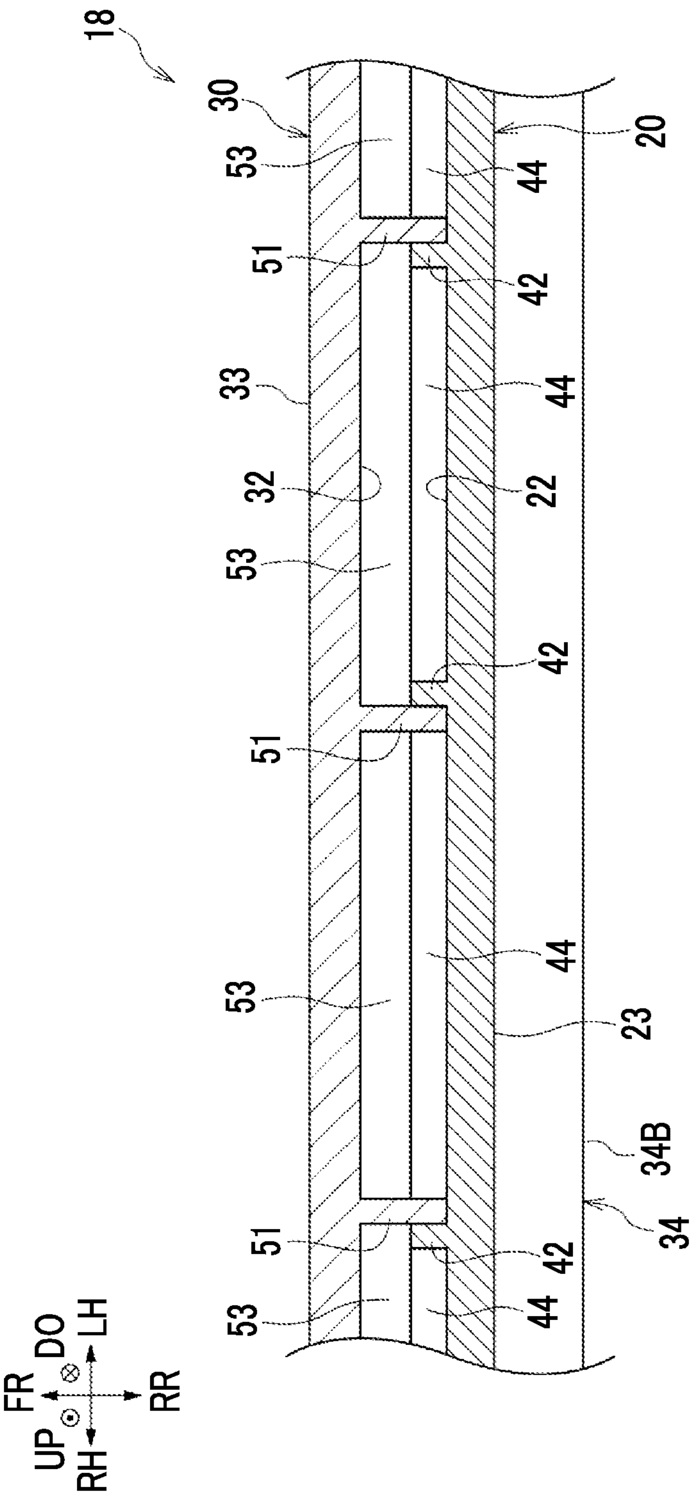
FIG. 19 is a plan cross-sectional view illustrating the exterior cover according to the modification example.

As a configuration in which the second rib 42 is in contact with the first rib 51 from one side in the right-left direction, as illustrated in FIG. 19, one second rib 42 (the second rib 42 on the leftmost side in FIG. 19) may be in contact with the first rib 51 from the right side, and another second rib 42 (the second rib 42 positioned second from the left in FIG. 19) may be in contact with the first rib 51 from the left side. Further, another second rib 42 (the second rib 42 on the rightmost side in FIG. 19) may be in contact with the first rib 51 from the right side.

The right side is an example of one side in the second direction, and the left side is an example of the other side in the second direction.

According to the configuration in FIG. 19, as compared with a case where one second rib 42 (the second rib 42 on the leftmost side in FIG. 19) is in contact with the first rib 51 from the right side and another second rib 42 (the second rib 42 positioned second from the left in FIG. 19) is in contact with the first rib 51 from the right side (that is, the same side), the first rib 51 is less likely to collapse, and the deformation of the exterior cover main body 30 is suppressed.

Figure 20:
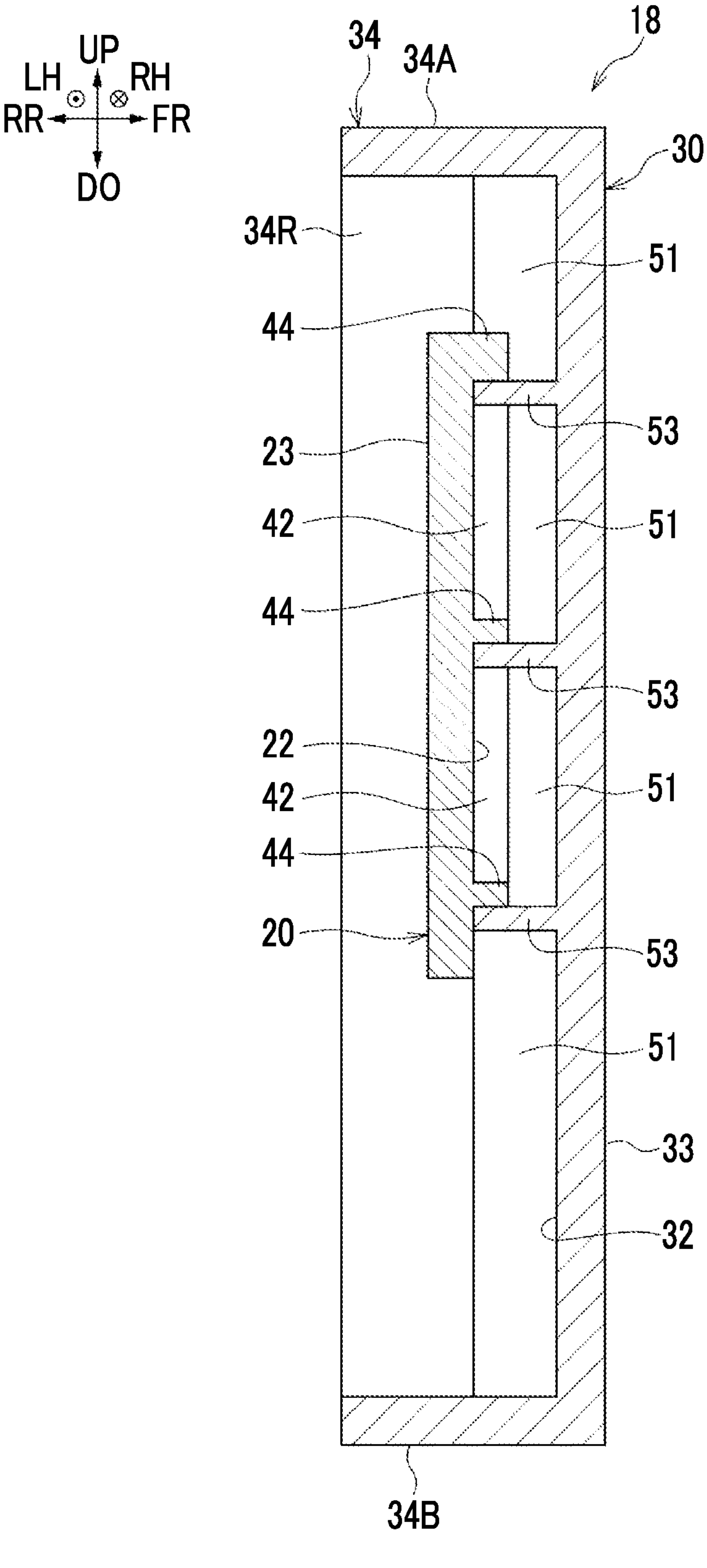
FIG. 20 is a side cross-sectional view illustrating the exterior cover according to the modification example.

Further, in the present exemplary embodiment, the third rib 53 is sandwiched between the fourth ribs 44 in the up-down direction, but the present exemplary embodiment is not limited thereto. As illustrated in FIG. 20, a configuration may be used in which the fourth rib 44 is in contact with the third rib 53 from one side in the up-down direction. In the configuration illustrated in FIG. 20, each of the fourth ribs 44 is in contact with each of the third ribs 53 from the upper side. Each of the fourth ribs 44 may be in contact with each of the third ribs 53 from the lower side.

Figure 21:
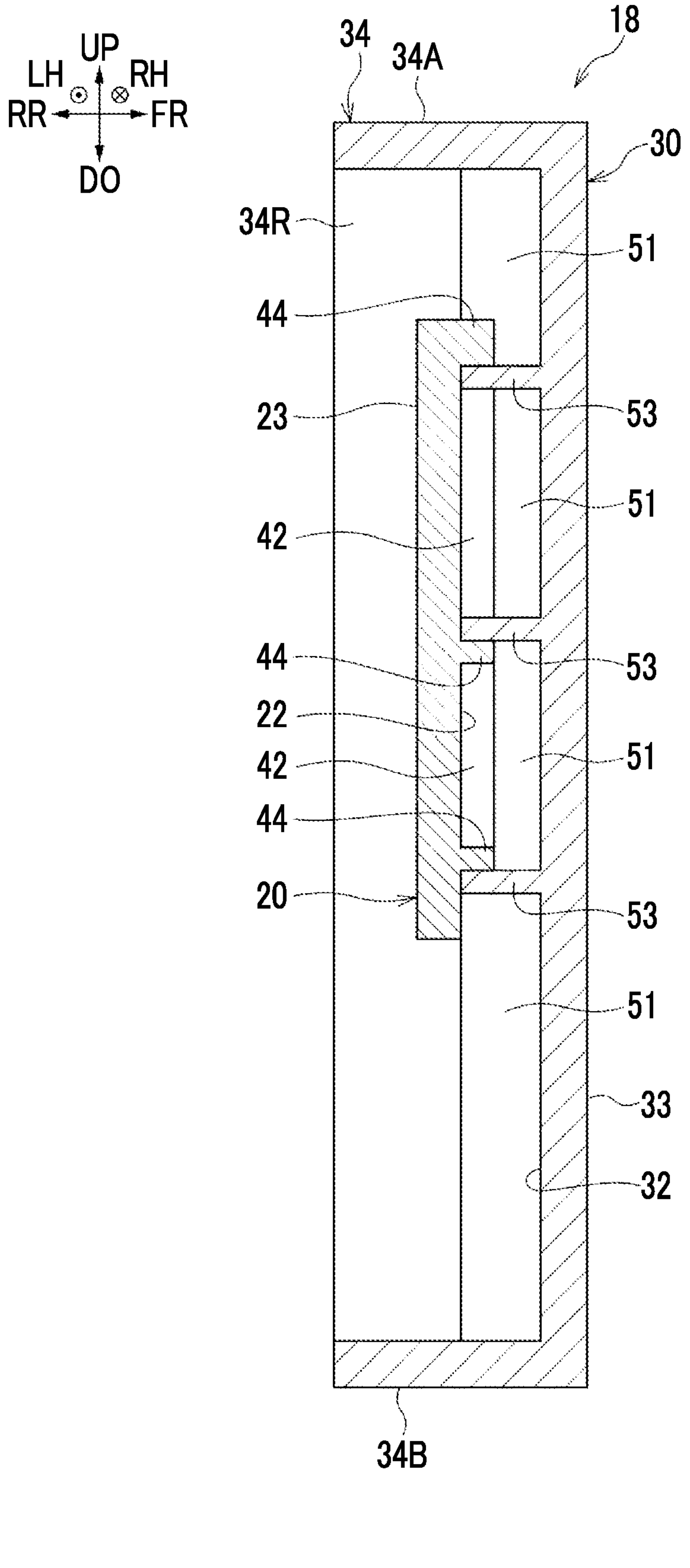
FIG. 21 is a side cross-sectional view illustrating the exterior cover according to the modification example.

As a configuration in which the fourth rib 44 is in contact with the third rib 53 from one side in the up-down direction, as illustrated in FIG. 21, one fourth rib 44 (the fourth rib 44 on the uppermost side in FIG. 20) may be in contact with the third rib 53 from the upper side, and another fourth rib 44 (the fourth rib 44 positioned second from the top in FIG. 20) may be in contact with the third rib 53 from the lower side. Further, another fourth rib 44 (the fourth rib 44 on the lowermost side in FIG. 20) may be in contact with the third rib 53 from the upper side.

The upper side is an example of one side in the first direction, and the lower side is an example of the other side in the first direction.

According to the configuration in FIG. 21, as compared with a case where one fourth rib 44 (the fourth rib 44 on the uppermost side in FIG. 20) is in contact with the third rib 53 from the upper side and another fourth rib 44 (the fourth rib 44 positioned second from the top in FIG. 20) is in contact with the third rib 53 from the upper side (that is, the same side), the third rib 53 is less likely to collapse, and the deformation of the exterior cover main body 30 is suppressed.

Furthermore, a configuration may be used in which only one of the plurality of second ribs 42 and only one of the plurality of fourth ribs 44 may be formed. Further, a configuration may be used in which only one of the second rib 42 or the fourth rib 44 is formed.

In the present exemplary embodiment, the first rib 51 is regarded as an example of the first projection portion and the second rib 42 is regarded as an example of the second projection portion, but the third rib 53 may be regarded as an example of the first projection portion and the fourth rib 44 may be regarded as an example of the second projection portion. In this case, the right-left direction is an example of the first direction, and the up-down direction is an example of the second direction. Further, in the present exemplary embodiment, the third rib 53 is regarded as an example of the third projection portion and the fourth rib 44 is regarded as an example of the fourth projection portion, but the first rib 51 may be regarded as an example of the third projection portion and the second rib 42 may be regarded as an example of the fourth projection portion.

The exemplary embodiment of the present invention is not limited to the above-described exemplary embodiment, and various modifications, changes, and improvements can be made within a range that does not deviate from the gist thereof. For example, a plurality of the modification examples illustrated above may be combined and configured as appropriate.

Evaluation

In the present evaluation, the effect of suppressing the deformation of the exterior cover main body 30 according to the present exemplary embodiment is evaluated with respect to the following Example and Comparative Example.

Example

In Example, the exterior cover 18, in which the internal part 20 illustrated in FIGS. 8 and 9 described above is attached to the exterior cover main body 30, is used as an evaluation target. In Example, as illustrated in FIG. 4, the first rib 51 is sandwiched between the second ribs 42 in the right-left direction. Further, in Example, as illustrated in FIG. 5, the third rib 53 is sandwiched between the fourth ribs 44 in the up-down direction.

Comparative Example

In Comparative Example, the exterior cover 18, in which the internal part 20 illustrated in FIG. 12 described above is attached to the exterior cover main body 30, is used as an evaluation target. In Comparative Example, as illustrated in FIG. 10, the second rib 42 is not in contact with the first rib 51 in the right-left direction. Further, in Comparative Example, as illustrated in FIG. 11, the fourth rib 44 is in not in contact with the third rib 53 in the up-down direction.

Evaluation Method

Figure 22:
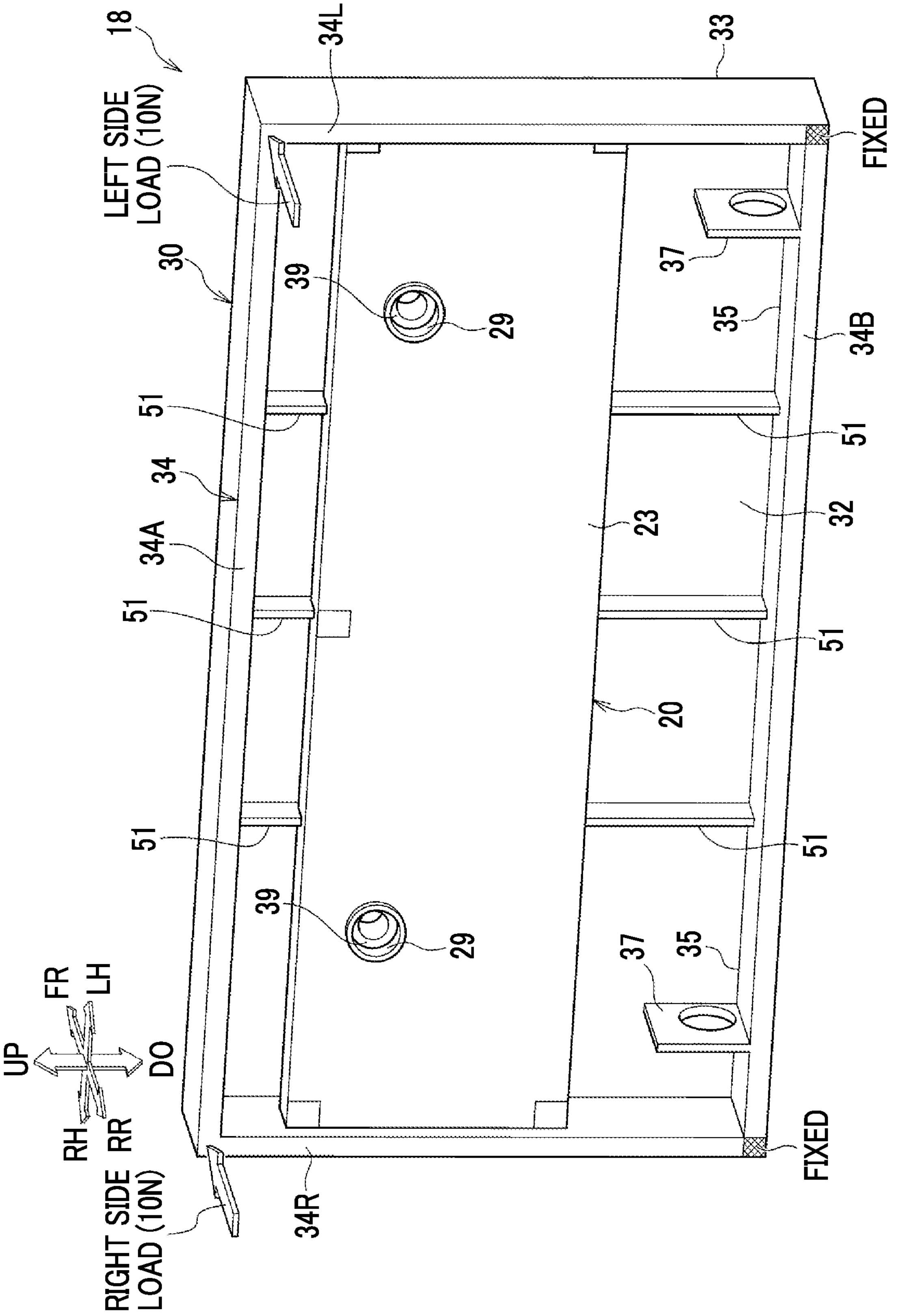
FIG. 22 is a description view illustrating an evaluation method performed on the exterior cover.

As illustrated in FIG. 22, in Example and Comparative Example, a displacement amount in a case where a load (10 N) is applied to the left side of the upper end portion of the exterior cover 18 and a displacement amount in a case where a load (10 N) is applied to the right side of the upper end portion of the exterior cover 18 are obtained, in a state in which each of the left and right parts of the lower end portions of the exterior cover 18 is fixed.

Figure 23:
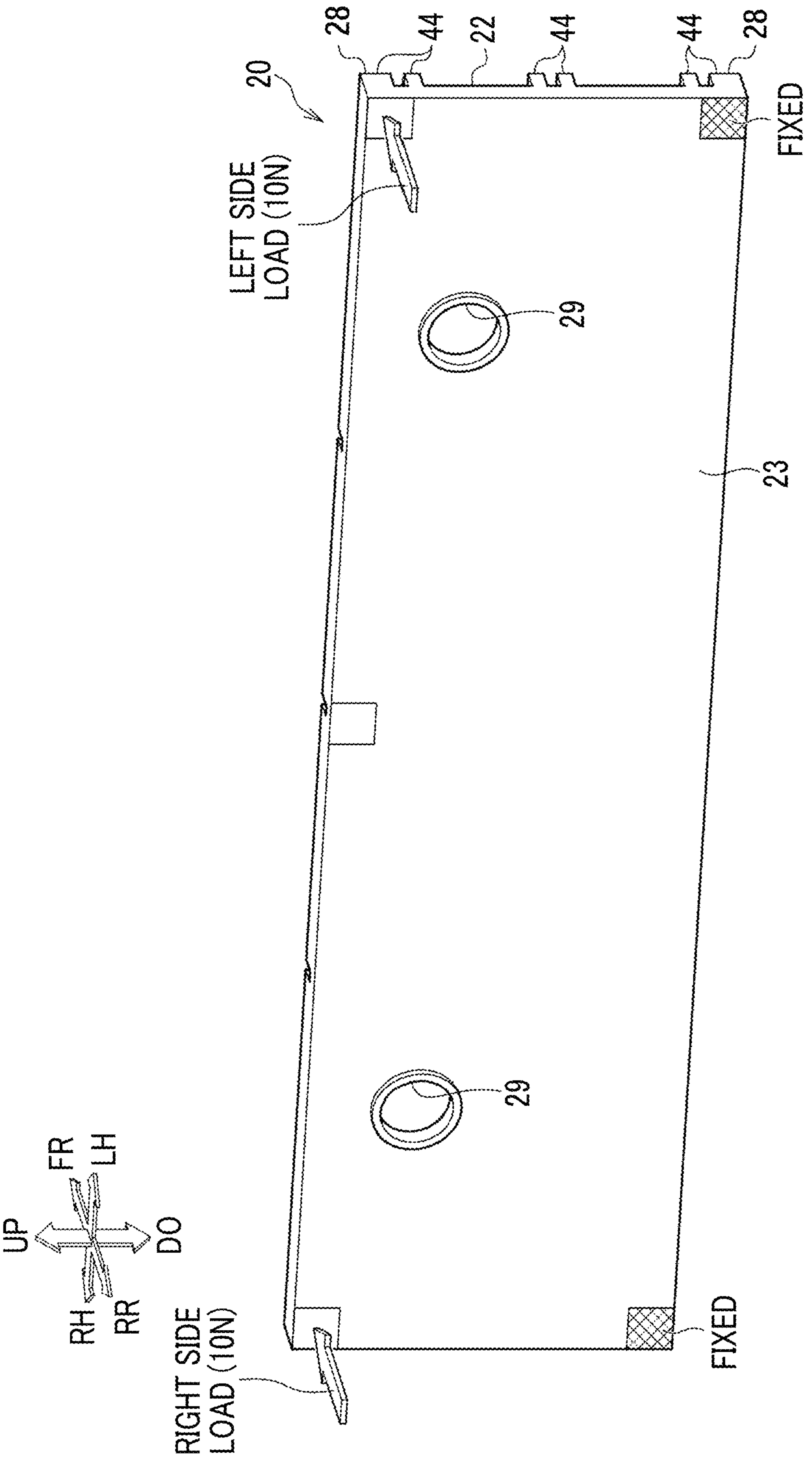
FIG. 23 is a description view illustrating an evaluation method performed on the internal part as a single item.

Further, as illustrated in FIG. 23, in Example and Comparative Example, a displacement amount in a case where a load (10 N) is applied to the left side of the upper end portion of the internal part 20 and a displacement amount in a case where a load (10 N) is applied to the right side of the upper end portion of the internal part 20 are obtained, in a state in which each of the left and right parts of the lower end portions of the single internal part 20 is fixed.

Evaluation Result

As illustrated in a result table in FIG. 24, in the exterior cover 18 in which the internal part 20 is attached to the exterior cover main body 30, the displacement amount becomes smaller in Example than in Comparative Example regardless of whether a load is applied to the right side or the left side. Therefore, a confirmation is made that Example has the effect of suppressing the deformation of the exterior cover main body 30.

On the other hand, a confirmation is made that, in the single internal part 20, the displacement amount is slightly smaller in Comparative Example than in Example, and the deformation is less likely to occur in Comparative Example regardless of whether a load is applied to the left side or the right side.

Supplementary Note (((1)))

A cover comprising:

a cover main body that is attached to an attachment target and that has an inner surface facing an attachment target side;

a first projection portion that protrudes from the inner surface and that is formed along a first direction;

an attachment portion that is attached to the inner surface of the cover main body and that has a facing surface facing the inner surface; and a second projection portion that protrudes from the facing surface, that is formed along the first direction, and that is in contact with the first projection portion in a second direction intersecting the first direction.

(((2)))

The cover according to (((1))), wherein one of a plurality of first projection portions or a plurality of second projection portions are formed in the second direction, and the other of the first projection portion or the second projection portion is sandwiched between the one of the first projection portions or the second projection portions in the second direction, or both of the plurality of first projection portions and the plurality of second projection portions are formed in the second direction and are sandwiched between each other in the second direction.

(((3)))

The cover according to (((2))), wherein the plurality of second projection portions are formed in the second direction, and the first projection portion is sandwiched between the second projection portions in the second direction, and the second projection portion is not sandwiched between the first projection portions in the second direction.

(((4)))

The cover according to any one of (((1))) to (((3))), wherein a plurality of first projection portions are formed in the second direction, a plurality of second projection portions are formed in the second direction, and the plurality of second projection portions are in contact with the plurality of first projection portions in the second direction, respectively.

(((5)))

The cover according to (((4))), wherein one of the second projection portions is in contact with one of the first projection portions from one side in the second direction, and another of the second projection portions is in contact with another of the first projection portions from the other side in the second direction.

(((6)))

The cover according to any one of (((1))) to (((5))), further comprising:

a third projection portion that protrudes from the inner surface, that is connected to the first projection portion, and that is formed along the second direction; and a fourth projection portion that protrudes from the facing surface, that is connected to the second projection portion, that is formed along the second direction, and that is in contact with the third projection portion in the first direction.

(((7)))

The cover according to (((6))), wherein one of a plurality of third projection portions or a plurality of fourth projection portions are formed in the first direction, and the other of the third projection portion or the fourth projection portion is sandwiched between the one of the third projection portions or the fourth projection portions in the first direction, or both of the plurality of third projection portions and the plurality of fourth projection portions are formed in the first direction and are sandwiched between each other in the first direction.

(((8)))

The cover according to (((7))), wherein the plurality of fourth projection portions are formed in the first direction, and the third projection portion is sandwiched between the fourth projection portions in the first direction, and the fourth projection portion is not sandwiched between the third projection portions in the first direction.

(((9)))

The cover according to any one of (((6))) to (((8))), wherein a plurality of third projection portions are formed in the first direction, a plurality of fourth projection portions are formed in the first direction, and the plurality of fourth projection portions are in contact with the plurality of third projection portions in the first direction, respectively.

(((10)))

The cover according to (((9))), wherein one of the fourth projection portions is in contact with one of the third projection portions from one side in the first direction, and another of the fourth projection portions is in contact with another of the third projection portions from the other side in the first direction.

(((11)))

The cover according to any one of (((1))) to (((10))), wherein the cover main body is attached to the attachment target in an openable and closable manner, and the inner surface faces the attachment target side in a closed position.

(((12)))
The cover according to (((11))),
wherein the attachment portion includes an inner surface facing the attachment target side in a closed position of the cover main body, and
at least one of a projection portion along the first direction or a projection portion along the second direction is not formed on the inner surface.
(((13)))
A housing comprising:
a housing main body as the attachment target; and
the cover according to any one of (((1))) to (((12))) in which the cover main body is attached to the housing main body in an openable and closable manner.
(((14)))
An image forming apparatus comprising:
an apparatus main body as the attachment target;
an image forming portion that is provided inside the apparatus main body and that forms an image on a recording medium; and
the cover according to any one of (((1))) to (((12))) in which the cover main body is attached to the apparatus main body in an openable and closable manner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cover comprising:
a cover main body that is attached to an attachment target and that has an inner surface facing an attachment target side;
a first projection portion that protrudes from the inner surface and that is formed along a first direction;
an attachment portion that is attached to the inner surface of the cover main body and that has a facing surface facing the inner surface; and
a second projection portion that protrudes from the facing surface, that is formed along the first direction, and that is in contact with the first projection portion in a second direction intersecting the first direction.

2. The cover according to claim 1,
wherein a plurality of first projection portions are formed in the second direction, and a plurality of second projection portions are formed in the second direction,
one of the plurality of first projection portions is sandwiched between adjacent two of the plurality of second projection portions in the second direction, or
one of the plurality of second projection portions is sandwiched between adjacent two of the plurality of first projection portions in the second direction, or
the plurality of first projection portions and the plurality of second projection portions are sandwiched between each other in the second direction.

3. The cover according to claim 2,
wherein in a case where the one of the plurality of first projection portions is sandwiched between the adjacent two of the plurality of second projection portions in the second direction, one of the plurality of second projection portions is not sandwiched between adjacent two of the plurality of first projection portions in the second direction.

4. A housing comprising:
a housing main body as the attachment target; and
the cover according to claim 3 in which the cover main body is attached to the housing main body in an openable and closable manner.

5. A housing comprising:
a housing main body as the attachment target; and
the cover according to claim 2 in which the cover main body is attached to the housing main body in an openable and closable manner.

6. The cover according to claim 1,
wherein a plurality of first projection portions are formed in the second direction,
a plurality of second projection portions are formed in the second direction, and
the plurality of second projection portions are in contact with the plurality of first projection portions in the second direction, respectively.

7. The cover according to claim 6,
wherein one of the second projection portions is in contact with one of the first projection portions from one side in the second direction, and
another of the second projection portions is in contact with another of the first projection portions from the other side in the second direction.

8. A housing comprising:
a housing main body as the attachment target; and
the cover according to claim 7 in which the cover main body is attached to the housing main body in an openable and closable manner.

9. A housing comprising:
a housing main body as the attachment target; and
the cover according to claim 6 in which the cover main body is attached to the housing main body in an openable and closable manner.

10. The cover according to claim 1, further comprising:
a third projection portion that protrudes from the inner surface, that is connected to the first projection portion, and that is formed along the second direction; and
a fourth projection portion that protrudes from the facing surface, that is connected to the second projection portion, that is formed along the second direction, and that is in contact with the third projection portion in the first direction.

11. The cover according to claim 10,
wherein a plurality of third projection portions are formed in the first direction, and a plurality of fourth projection portions are formed in the first direction,
one of the plurality of third projection portions is sandwiched between adjacent two of the plurality of fourth projection portions in the first direction, or
one of the plurality of fourth projection portions is sandwiched between adjacent two of the plurality of third projection portions in the first direction, or
the plurality of third projection portions and the plurality of fourth projection portions are sandwiched between each other in the first direction.

12. The cover according to claim 11,
wherein in a case where the one of the plurality of third projection portions is sandwiched between the adjacent two of the plurality of fourth projection portions in the first direction, one of the plurality of fourth projection portions is not sandwiched between adjacent two of the plurality of third projection portions in the first direction.

13. A housing comprising:

a housing main body as the attachment target; and the cover according to claim 11 in which the cover main body is attached to the housing main body in an openable and closable manner.

14. The cover according to claim 10, wherein a plurality of third projection portions are formed in the first direction, a plurality of fourth projection portions are formed in the first direction, and the plurality of fourth projection portions are in contact with the plurality of third projection portions in the first direction, respectively.

15. The cover according to claim 14, wherein one of the fourth projection portions is in contact with one of the third projection portions from one side in the first direction, and another of the fourth projection portions is in contact with another of the third projection portions from the other side in the first direction.

16. A housing comprising:

a housing main body as the attachment target; and the cover according to claim 10 in which the cover main body is attached to the housing main body in an openable and closable manner.

17. The cover according to claim 1, wherein the cover main body is attached to the attachment target in an openable and closable manner, and the inner surface faces the attachment target side in a closed position.

18. The cover according to claim 17, wherein the attachment portion includes an inner surface facing the attachment target side in a closed position of the cover main body, and at least one of a projection portion along the first direction or a projection portion along the second direction is not formed on the inner surface.

19. A housing comprising:

a housing main body as the attachment target; and the cover according to claim 1 in which the cover main body is attached to the housing main body in an openable and closable manner.

20. An image forming apparatus comprising:

an apparatus main body as the attachment target;

an image forming portion that is provided inside the apparatus main body and that forms an image on a recording medium; and the cover according to claim 1 in which the cover main body is attached to the apparatus main body in an openable and closable manner.

* * * * *